United States Patent [19]
Kanome et al.

[11] Patent Number: 5,527,497
[45] Date of Patent: Jun. 18, 1996

[54] PROCESS AND APPARATUS FOR MANUFACTURING SUBSTRATE SHEET FOR OPTICAL RECORDING MEDIUMS, AND PROCESS FOR PREPARING STAMPER

[75] Inventors: Osamu Kanome; Hirofumi Kamitakahara; Yomishi Toshida; Tsuyoshi Santo, all of Yokohama; Hitoshi Yoshino, Zama; Toshiya Yuasa, Kawasaki; Hiroshi Tanabe, Kawasaki, all of Japan

[73] Assignee: Canon Kabushiki Kaisha, Tokyo, Japan

[21] Appl. No.: 154,561

[22] Filed: Nov. 19, 1993

[30] Foreign Application Priority Data

Nov. 26, 1992 [JP] Japan .................................. 4-317260
Nov. 27, 1992 [JP] Japan .................................. 4-318952

[51] Int. Cl.$^6$ ............................ B29D 17/00; B29C 43/24
[52] U.S. Cl. ...................... 264/1.330; 264/1.6; 264/39; 264/210.2; 264/284; 425/230; 425/327; 425/367; 425/385; 425/810
[58] Field of Search ................................. 264/1.33, 106, 264/107, 39, 210.1, 1.6, 284, 210.2; 425/363, 367, 385, 810, 225, 230, 327

[56] References Cited

U.S. PATENT DOCUMENTS

| | | | |
|---|---|---|---|
| 3,999,914 | 12/1976 | Breher et al. | 425/114 |
| 4,482,511 | 11/1984 | Komatsubara | 264/1.33 |
| 4,871,601 | 10/1989 | Miura et al. | 428/64 |
| 4,958,558 | 9/1990 | Harreither | 100/41 |
| 4,965,153 | 10/1990 | Imataki et al. | 430/11 |
| 5,073,101 | 12/1991 | Imataki et al. | 425/810 |
| 5,147,592 | 9/1992 | Sato et al. | 264/167 |
| 5,147,763 | 9/1992 | Kamitakahara . | |
| 5,169,583 | 12/1992 | Moriguchi et al. | 264/210.1 |
| 5,248,584 | 9/1993 | Miura et al. | 430/270 |
| 5,281,371 | 1/1994 | Tamura et al. . | |

FOREIGN PATENT DOCUMENTS

| | | |
|---|---|---|
| 0155000 | 9/1985 | European Pat. Off. . |
| 0362192 | 4/1990 | European Pat. Off. . |
| 0387037 | 9/1990 | European Pat. Off. . |
| 0405898 | 1/1991 | European Pat. Off. . |
| 0478372 | 4/1992 | European Pat. Off. . |
| 0507600 | 10/1992 | European Pat. Off. . |
| 58-25925 | 2/1983 | Japan . |
| 63-188412 | 8/1988 | Japan . |
| 4-307223 | 10/1992 | Japan . |
| 1198342 | 7/1970 | United Kingdom . |

OTHER PUBLICATIONS

Patent Abstracts of Japan, vol. 13, No. 135(P–851), Dec. 9, 1988.

*Primary Examiner*—Mathieu D. Vargot
*Attorney, Agent, or Firm*—Fitzpatrick, Cella, Harper & Scinto

[57] ABSTRACT

Optical recording mediums are prepared by extrusion molding. In the extrusion molding, a thermoplastic resin heated to a given temperature is pressed between a roll stamper and a roll opposite thereto. A gap between the roll stamper and the roll is precisely defined by belt members fixed on each side of the roll where the roll does not come into touch with the thermoplastic resin. The joints of the respective belt members are formed at positions different from each other on the periphery of the roll. Alternatively the gap may be defined by cutting the roll substrate at a part on which the stamper member is fixed, or by interposing endless belts with a given thickness between the roll stamper and the roll. The stamper member provided on the roll stamper is reduced in stress, and has a surface precision of 10 μm or less.

49 Claims, 18 Drawing Sheets

5,527,497

PROCESS AND APPARATUS FOR MANUFACTURING SUBSTRATE SHEET FOR OPTICAL RECORDING MEDIUMS, AND PROCESS FOR PREPARING STAMPER

BACKGROUND OF THE INVENTION

1. Field of the Invention

This invention relates to a process, and an apparatus, for continuously manufacturing substrates for optical recording mediums.

It also relates to a process for preparing a stamper having fine patterns and e process for preparing a photomask.

2. Description of the Related Art

In recent years, a process making use of extrusion stamping molding as shown in FIG. 4 has been studied as a process for manufacturing substrates for optical recording mediums such as optical disks and optical cards having on their surfaces an information structure comprised of raised portions and/or engraved portions (hereinafter "preformats").

This is a process in which a molten resin sheet 401 extruded from an extruder 101 is pressed between a roll stamper 402 having on its periphery a pattern or patterns corresponding to the preformats (hereinafter "preformat pattern(s)") and a molding roll 403 provided opposingly to the roll stamper so that the preformat patterns are continuously transferred to the resin sheet. This process has attracted notice as a process that can greatly improve the mass productivity of substrates for optical recording mediums.

When the substrates for optical recording mediums are manufactured, it is sought, whatever their manufacturing process is, to settle two technical issues, i.e., to improve transfer precision of preformat patterns and to decrease birefringence (or double refraction) of substrates.

In order to further improve the transfer precision of preformat patterns to substrates and to more decrease the birefringence of substrates, it is effective to intentionally or positively control conditions for their stamping molding.

However, controlling the gap between the roll stamper and the molding roll causes a variation in thickness of substrate sheets. Such a variation in thickness of substrates for optical recording mediums further causes a non-uniformity of the quality of reproducing signals (e.g., C/N ratio) even if it is within the tolerance defined by a standard (usually, within ±10% of a standard thickness), and hence in recent years it has been sought to make the variation as small as possible. Accordingly, when such extrusion stamping molding is used, it has become necessary to control the variation of a gap "d" (hereinafter "gap variation") between the pattern forming surface of the roll stamper and the surface of the molding roll provided opposingly to the roll stamper to make it smaller, stated specifically, it has become necessary to make the gap variation, for example, 30 µm or less, particularly 20 µm or less, end more particularly 10 µm or less.

Since, however, it is common for roll stampers and molding rolls to have eccentricity of their own, a great cost is required for controlling the eccentricity to produce roll stampers and molding rolls that may give the small gap variation as stated above. In an attempt to achieve the stated gap precision while using roll stampers and molding rolls having eccentricity, it becomes necessary to operate in such a very poor efficiency that a combination making the gap variation small must be selected from among a large number of roll stempars, also causing a cost increase for the production of substrates.

For the foregoing reasons, it is sought to provide a process, and an apparatus, for producing substrates with a good sheet thickness precision by extrusion stamping molding at a low cost.

SUMMARY OF THE INVENTION

The present invention was made taking account of the problems discussed above. An object of the present invention is to provide a process for manufacturing substrates for optical recording mediums that can always maintain a small gap variation and hence can produce the substrates at a low cost, promising a superior transfer precision of preformat patterns, a low birefringence and a superior sheet thickness precision.

Another object of the present invention is to provide an apparatus for manufacturing substrates for optical recording mediums that can stably maintain a very small gap variation and can produce the substrates with high quality at a low cost.

Still another object of the present invention is to provide a process, and an apparatus, for manufacturing substrates for optical recording mediums, that can shorten the molding-fit time for the stamping molding of high-quality substrates for optical recording mediums.

A further object of the present invention is to provide a master stamper that can give a stamper capable of further decreasing the gap variation, and a process for preparing a stamper making use of it.

The process for manufacturing substrates for optical recording mediums according to the present invention is a process for successively preparing substrates for optical recording mediums, comprising the steps of:

feeding a thermoplastic resin heated to a given temperature, to a gap between a roll stamper provided along its periphery with a preformat pattern and a roll provided opposingly to the roll stamper, from a means for extruding the thermoplastic resin while rotating the roll stamper and the roll at a given rotational speed; and pressing the thermoplastic resin between the roll stamper and the roll to make transfer of the preformat pattern; wherein, said thermoplastic resin is pressed between said roll stamper and said roll while bringing the former into contact with the latter through a gap control means at a region other than the region in which said roll stamper comes into contact with the thermoplastic resin on said roll.

The process for manufacturing substrates for optical recording mediums according to the present invention is also a process for successively preparing substrates for optical recording mediums, comprising the steps of:

feeding a thermoplastic resin heated to a given temperature, to a gap between a roll stamper comprising a roll substrate fitted along its periphery with a stamper member having a preformat pattern and a molding roll provided opposingly to the roll stamper, from a means for extruding the thermoplastic resin while rotating the roll stamper and the molding roll at a given rotational speed; and pressing the thermoplastic resin between the roll stamper and the molding roll to make transfer of the preformat pattern; wherein, said thermoplastic resin is pressed between said roll
stamper and said molding roll while bringing the
former into contact with the latter through a gap control
means at a region other then the region in which said
roll stamper comes into contact with the thermoplastic
resin on said molding roll; and said stamper member is comprised of a stamper having a
surface precision of 10 microns or less.

The process for manufacturing substrates for optical recording mediums according to the present invention is still also a process for successively preparing substrates for optical recording mediums, comprising the steps of:

feeding a thermoplastic resin heated to a given temperature, to a gap between a roll stamper comprising a roll substrate fitted along its periphery with a stamper member having a preformat pattern and a molding roll provided opposingly to the roll stamper, from a means for extruding the thermoplastic resin while rotating the roll stamper and the molding roll at a given rotational speed; and pressing the thermoplastic resin between the roll stamper and the molding roll to make transfer of the preformat pattern; wherein, said stamper member is comprised of a stamper having a surface precision of 10 microns or less.

The process for manufacturing substrates for optical recording mediums according to the present invention is further a process for successively preparing substrates for optical recording mediums, comprising the steps of:

feeding a thermoplastic resin heated to a given temperature, to a gap between a roll stamper comprising a roll substrate fitted along its periphery with a stamper member having a preformat pattern and a molding roll provided opposingly to the roll stamper, from a means for extruding the thermoplastic resin while rotating the roll stamper and the molding roll at a given rotational speed; and pressing the thermoplastic resin between the roll stamper and the molding roll to make transfer of the preformat pattern; wherein, said thermoplastic resin is pressed between said roll stamper and said molding roll while bringing the former into contact with the latter through a gap control means at a region other than the region in which said roll stamper comes into contact with the thermoplastic resin on said molding roll; and said stamper member is comprised of a stamper produced from a master stamper prepared accordingly to the steps of:

forming a pattern forming layer on the surface of the substrate;

forming a positive resist layer on the pattern forming layer;

selectively exposing the positive resist layer in accordance with the preformat pattern of the optical recording medium and at the same time exposing the resist layer other than that in the region in which the pattern is formed;

developing the resist layer to form a resist pattern; and etching the pattern forming layer, using the resist pattern as a mask.

The apparatus for manufacturing substrates for optical recording mediums according to the present invention is an apparatus for successively preparing substrates for optical recording mediums, comprising:

a means for extruding a thermoplastic resin;

a roll stamper provided along its periphery with a preformat pattern; and a roll for molding the substrates for optical recording mediums by pressing the extruded resin between the roll and the roll stamper to transfer the preformat pattern to the surface of a sheet of the resin; wherein, said roll stamper and said roll are so provided as to come into contact with each other through a gap control means at a region other than the region in which said roll stamper comes into contact with the thermoplastic resin on said roll.

The apparatus for manufacturing substrates for optical recording mediums according to the present invention is also an apparatus for successively preparing substrates for optical recording mediums, comprising:

a means for extruding a thermoplastic resin;

a roll stamper comprising a roll substrate fitted along its periphery with a stamper member having a preformat pattern; and a molding roll for molding the substrates for optical recording mediums by pressing the extruded resin between the molding roll and the roll stamper to transfer the preformat pattern to the surface of a sheet of the resin: wherein, said roll stamper and said roll are so provided as to come into contact with each other through a gap control means at a region other than the region in which said roll stamper comes into contact with the thermoplastic resin on said roll; and said stamper member is comprised of a stamper having a surface precision of 10 microns or less.

The apparatus for manufacturing substrates for optical recording mediums according to the present invention is still also an apparatus for successively preparing substrates for optical recording mediums, comprising:

a means for extruding a thermoplastic resin;

a roll stamper comprising a roll substrate fitted along its periphery with a stamper member having a preformat pattern; and a molding roll for molding the substrates for optical recording mediums by pressing the extruded resin between the molding roll and the roll stamper to transfer the preformat pattern to the surface of a sheet of the resin; wherein, said stamper member is comprised of a stamper having a surface precision of 10 microns or less.

The apparatus for manufacturing substrates for optical recording mediums according to the present invention is further an apparatus for successively preparing substrates for optical recording mediums, comprising:

a means for extruding a thermoplastic resin;

a roll stamper comprising a roll substrate fitted along its periphery with a stamper member having a preformat pattern; and a molding roll for molding the substrates for optical recording mediums by pressing the extruded resin between the molding roll and the roll stamper to transfer the preformat pattern to the surface of a sheet of the resin; wherein, said roll stamper and said roll are so provided as to come into contact with each other through a gap control means at a region other than the region in which said roll stamper comes into contact with the thermoplastic resin on said roll; and said stamper member is comprised of a stamper produced from a master stamper prepared according to the steps of:

forming a pattern forming layer on the surface of the substrate;

forming a positive resist layer on the pattern forming layer;

selectively exposing the positive resist layer in accordance with the preformat pattern of the optical recording medium and at the same time exposing the resist layer other than that in the region in which the pattern is formed;

developing the resist layer to form a resist pattern; and etching the pattern forming layer, using the resist pattern as a mask.

The stamper for substrates for optical recording mediums according to the present invention is a stamper having on its surface a preformat pattern for substrates for optical recording mediums; wherein, said stamper has a surface precision of 10 microns or less.

The process for preparing a stamper according to the present invention is a process for preparing a stamper comprising a substrate provided in a given region of its surface, with a pattern forming member in a pattern, comprising the steps of:

forming a pattern forming layer on the surface of the substrate;

forming a positive resist layer on the pattern forming layer;

selectively exposing the positive resist layer in accordance with said pattern and at the same time exposing the resist layer other than that in the region in which the pattern is formed;

developing the resist layer to form a resist pattern; and etching the pattern forming layer, using the resist pattern as a mask.

The process for preparing a photomask according to the present invention is a process for preparing a photomask comprising a transparent substrate provided in a given region on its surface with a light-screening member in a pattern, comprising the steps of:

forming a light-screening layer on the surface of the substrate;

forming a positive resist layer on the light-screening layer;

selectively exposing the positive resist layer in accordance with said pattern and at the same time exposing the resist layer other than that in the region in which the pattern is formed;

developing the resist layer to form a resist pattern; and etching the pattern forming layer, using the resist pattern as a mask.

DESCRIPTION OF THE PREFERRED EMBODIMENTS

The present invention will be described below in detail with reference to the accompanying drawings.

Figure 1:
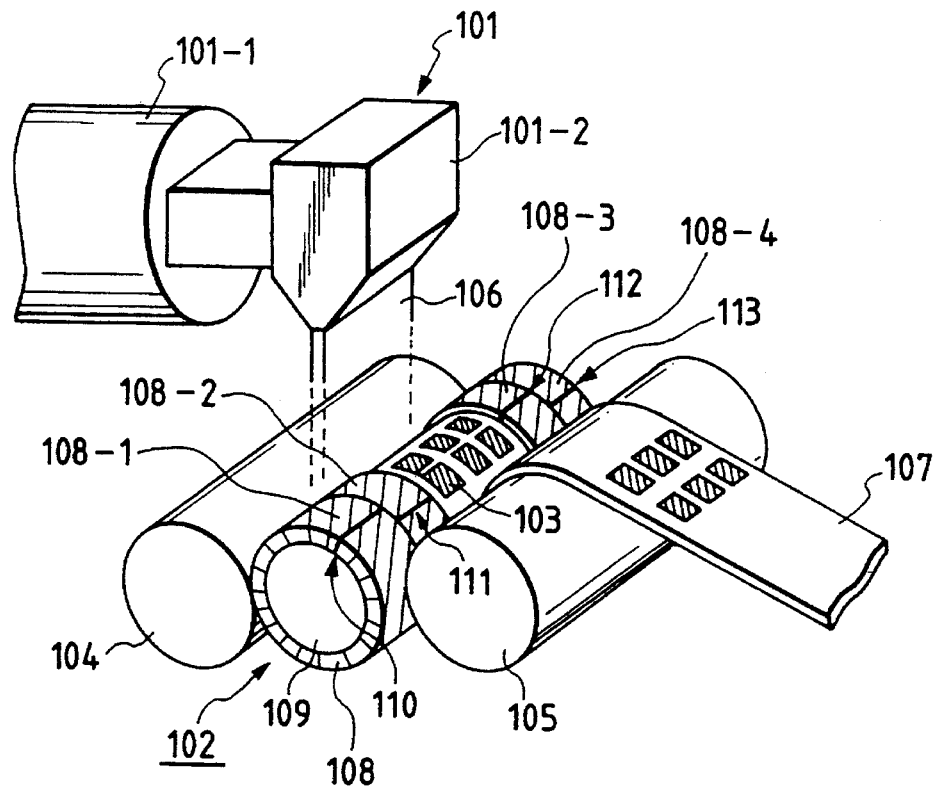
FIG. 1 is a schematic perspective view to illustrate an embodiment of the apparatus for manufacturing substrates for optical recording mediums according to the present invention.
Figure 2:
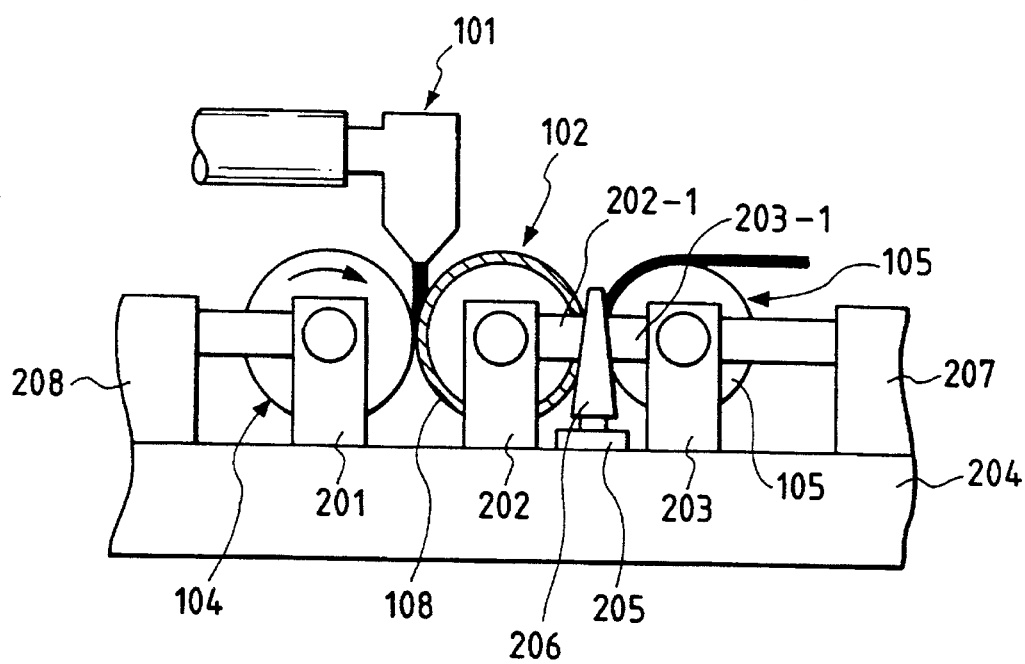
FIG. 2 is a schematic cross section of the apparatus shown in FIG. 1.
Figure 3:
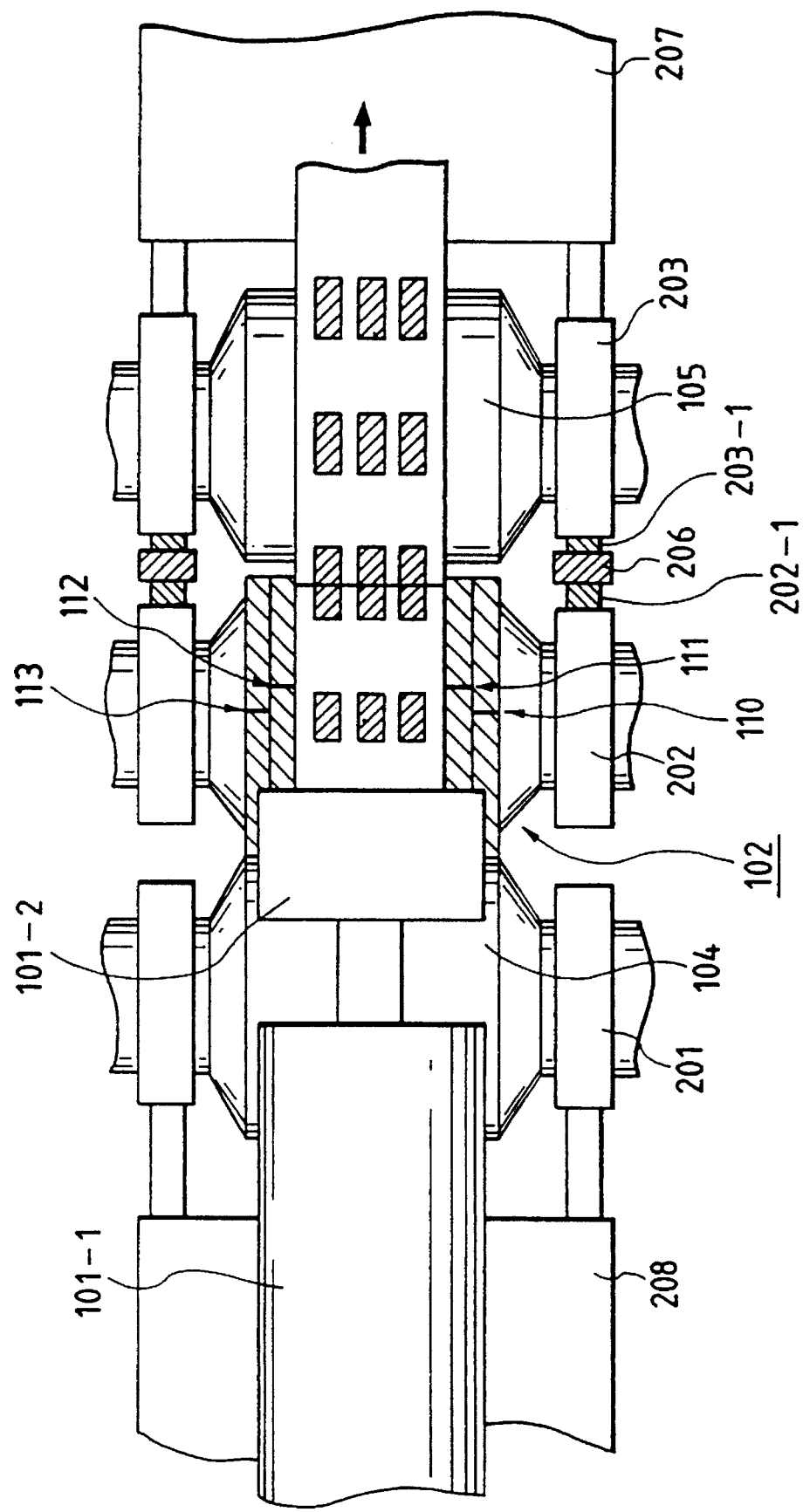
FIG. 3 is a schematic plan view of the apparatus shown in FIG. 1.

FIG. 1 is a schematic perspective view of an embodiment of the apparatus for continuously manufacturing substrates for optical recording mediums according to the present invention. FIG. 2 is a schematic cross section of the apparatus shown in FIG. 1, in the direction laying at right angles to the rotating shaft of a roll stamper. FIG. 3 is a schematic plan view of the apparatus shown in FIG. 1.

In FIGS. 1 to 3, reference numeral 101 denotes a means for extruding a thermoplastic resin, comprised of an extruder 101-1 that extrudes the thermoplastic resin while melt-kneading the resin and a sheet extrusion die 101-2 that forms the thermoplastic resin into a molten resin sheet with a given width; 102, a roll stamper having on its periphery a preformat pattern 103 for optical recording mediums; and 104 and 105, molding rolls each provided opposingly to the roll stamper 102.

Figure 7:
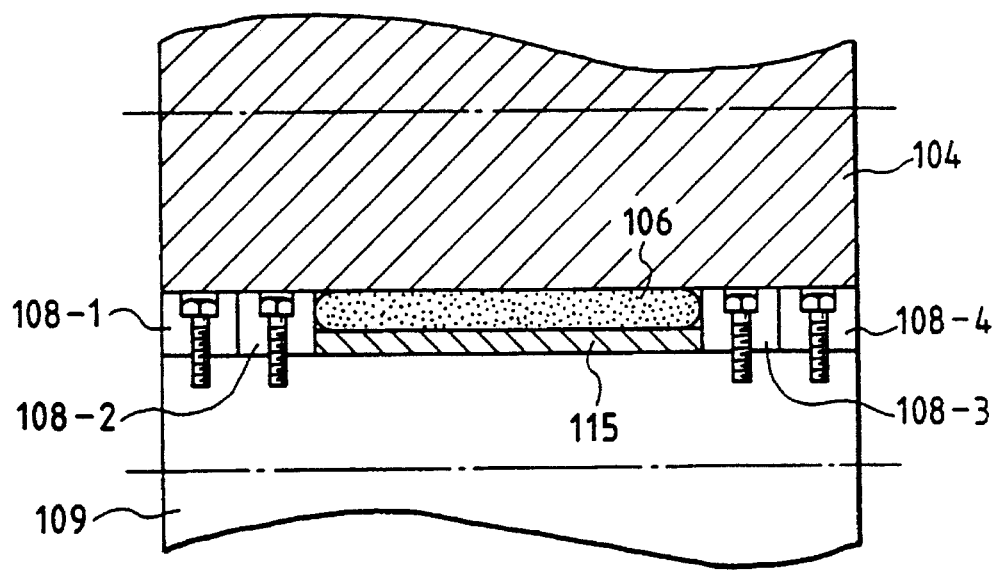
FIG. 7 is a schematic cross section of the part where a resin sheet is pressed between a roll and a stamper.

The roll stamper 102 is, as shown in FIG. 7, a cross section in the direction along the rotating shaft at the part where the resin is held between the roll stamper 102 and the molding roll 104, comprised of a flexible stamper member 115 fitted along the periphery of a roll substrate 109 and also a gap control means 108 formed on the roll substrate 109 in its region other than the region in which the roll stamper comes into contact with a thermoplastic resin sheet 106.

As shown in FIGS. 2 and 3, the roll stamper 102 and the molding rolls 104 and 105 are rotatably supported with bearings 201 to 203, respectively. These bearings are fitted to a pedestal 204 in the manner that they are each independently movable right and left as viewed in FIG. 2. The rolls are each formed in the manner that a heated fluid can circulate through its inside so that the surface temperature of each roll can be controlled to be a given temperature. The rolls are also each so constructed as to be rotatable by means of a drive motor (not shown) at a given speed in the direction shown in FIG. 2.

The bearings 202 and 203 are also fitted with tapered blocks 202-1 and 203-1, respectively, end e wedge type space adjusting member 206 is provided between the bearings 202 and 203 in the manner that it is movable right and left as viewed in FIG. 2, on the pedestal 204 through an elevator means 205. This space adjusting member 206 is so shaped that it can fit to the tapered surfaces of the tapered blocks 20-21 and 203-1. A pressure device 207 fixed on the pedestal 204 can press the roll stamper 102 via the bearings 203 and 202 leftward as viewed in FIG. 2 and a pressure device 208 can press the molding roll 104 via the bearing 201 rightward as viewed in FIG. 2, so that the molding roll 104 and the roll stamper 102 can be brought into contact with each other through the gap control means 108.

Figure 4:
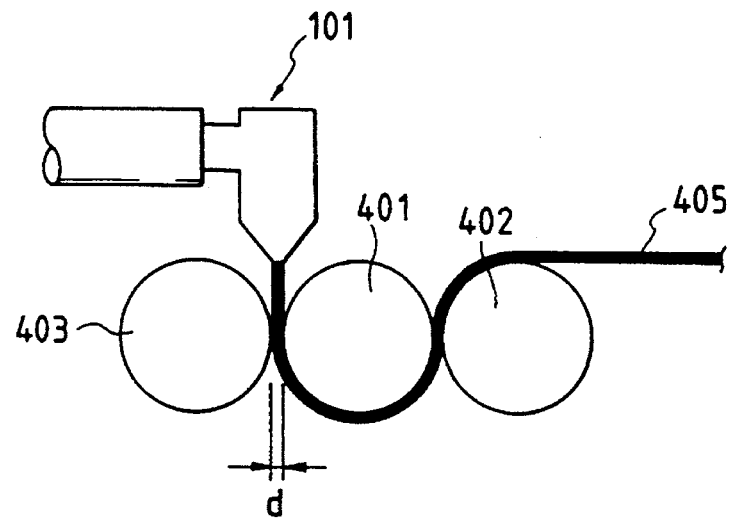
FIG. 4 is a schematic cross section of a conventional apparatus for manufacturing substrates for optical recording mediums.
Figure 5:
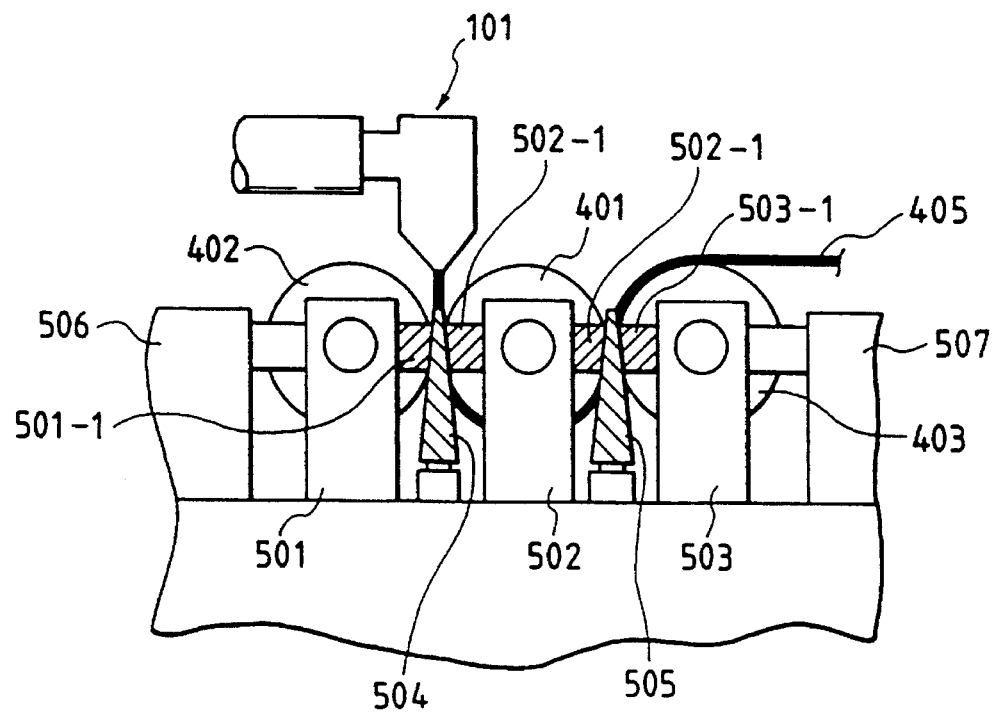
FIG. 5 is a schematic cross section of the apparatus shown in FIG. 4.
Figure 6:
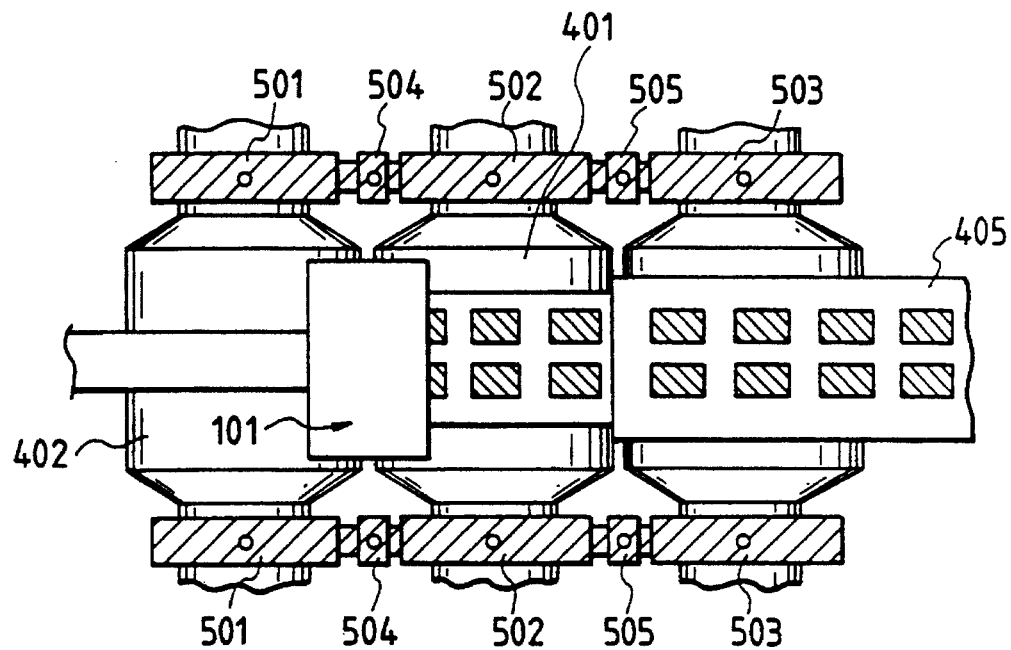
FIG. 6 is a schematic plan view of the apparatus shown in FIG. 4.

In the present invention, the thermoplastic resin sheet 106 may preferably be pressed between the roll stamper 102 and the molding roll 104 while they are pressed against each other so as to come into contact through the gap control means 108. More specifically, since in this way the thermoplastic resin sheet is pressed between the molding roll 104 and the roll stamper 102 while they are pressed against each other so as to come into contact through the gap control means 108, the gap "d" (See FIG. 4) formed by the roll stamper 102 and the molding roll 104 between which the thermoplastic resin sheet passes can be made free from its dependence on the eccentricity of each roll. For example, even in use of a Poll stamper and/or a molding roll each having a large eccentricity, the gap variation can be controlled to be very small, so that substrates for optical recording mediums having a superior preformat pattern sheet thickness precision and a high quality can be manufactured in a stable state and a low cost. Further, since the gap control means comes into contact with the periphery of the roll stamper 102, the molding-fit time (i.e., the time by which stamping molding becomes fit for obtaining the desired stamping-molded resin sheet) can be greatly shortened. In other words, the gap size in an apparatus for manufacturing a substrate sheet for optical recording mediums by a usual extrusion stamping molding process as shown in FIG. 4 is, (as shown in FIGS. 5 and 6, a schematic cross section and a plan view, respectively, of such an apparatus), defined by wedge type gap adjusting members 504 and 505 provided between bearings 501 to 503 that rotatably support a roll stamper 401 and specular rolls 402 and 403. More specifically, the bearings 501 to 503 are fitted with tapered blocks 501-1, 502-1 and 503-1, respectively, and the wedge-type gap adjusting members 504 and 505 are provided between the bearings 501 and 502 and the bearings 502 and 503, respectively. The gap adjusting members are moved up or down to make adjustment so as to give a given gap size, and thereafter a pressure is applied to each bearing by means of pressure devices 506 and 507. In this way, the gap is controlled.

In such an apparatus, however, a high pressure is applied to the bearings or the gap adjusting members. Hence, rigid materials that undergo no deformation due to the pressure are used and at the same time they are necessarily large in size. As a result, these members come to have a very large heat capacity.

For this reason, after the molding is started, it takes a long time before any variations of size due to thermal expansion of these members are converged, and the gap size is unstable during that time. Hence, the quality of the stamping-molded substrate sheet is unstable and the product cannot be of practical use. Thus, it takes a very long time (molding-fit time) before it becomes possible to stably obtain a high-quality substrate sheet for optical recording mediums.

On the other hand, the gap control means of the present invention is so thin and comes so closely into contact with the periphery of the roll stamper that it may cause only very little gap variation due to thermal expansion thereof, and also any gap variations are converged in a short time so that the molding-fit time can be greatly shortened.

In the present invention, the molding roll 104 may preferably be pressed against the roll stamper 102 at a total pressing force of from 50 to 1,200 kgf, particularly from 70 to 800 kgf, and more preferably from 100 to 500 kgf, as a pressure applied using the pressure device 208 to the bearing 201 supporting the molding roll 104. This is preferable because the state of contact between the roll stamper 102 and the molding roll 104 through the gap control means 108 cannot be released even if any variations (more or less) occur in the quantity of the thermoplastic resin being fed to the gap, and also because the roll stamper 102 and the molding roll 104 cannot be hindered from being smoothly rotated.

In the present embodiment, the roll substrate 109 having along its periphery the gap control means 108 can be formed, for example, by fixing a belt member on the roll substrate 109 et its given position, or by preparing an endless belt member beforehand and setting it in the roll substrate by shrinkage fitting or the like.

In the present invention, as materials for the gap control means 108, there are no particular limitations thereon so long as they are materials having a uniform thickness and undergoing no deformation or change in properties due to the heat or pressure during the stamping molding. It is possible to use, for example, metal sheets made of carbon steel, copper, nickel, aluminum, etc., alloy sheets made of brass, stainless steel, etc., ceramic sheets made of BN, SiN, glass, $Al_2O_3$, titanium nitride, etc., and also heat-resistant resin sheets made of polyimide, polyether imide, aromatic polyamide, etc.

The thickness precision of this gap control means 108 influences the gap variations, and may preferably be set within the amplitude of 10 μm or less, particularly 5 μm or less and more preferably 2 μm or less. Taking account of this thickness precision and excellent durability to heat and pressure, a stainless sheet is particularly preferred as a material for the gap control means 108 in the present embodiment.

When, for example, the belt member is used as the gap control means, this gap control means 108 can be fixed on the roll substrate by a method in which it is bonded to the periphery of the roll substrate 109 by the use of an adhesive as exemplified by an organic adhesive such as an epoxy adhesive, a silicone adhesive or a cyanoacrylate adhesive, an inorganic adhesive such as water glass or low-melting glass, or a low-melting alloy, or a method in which it is mechanically secured using means such as screws as shown in FIG. 7, or a metal belt.

In the case when as shown in FIG. 1 or 3 the gap control means 108 is comprised of non-endless belt members 18-1, 18-2, 18-3 and 18-4, they may be of such a length that gaps (110, 111, 112 and 113) are formed between their respective ends as shown in FIG. 1 or 3, when they are wound around the roll substrate 109. This is preferable because the ends do not run against each other resulting in no gap variations even if the belt members undergo expansion or elongation due to heat or pressure. The size of each gap may vary depending on the materials for the belt members. In a usual instance, it may preferably be in the range of from 5 to 50 mm, and particularly from 10 to 40 mm.

In the case when as described above the belt members are used and also they are so joined as to form the gaps between their ends when wound around the roll substrate, it is preferred that a plurality of belt members (e.g., 108-1 and 108-2, and 108-3 and 108-4, in FIG. 1) are, as shown in FIGS. 1, 3 and 7, each fixed on the periphery of the roll substrate 109 at its both ends in the width direction of the part at which the stamper member is fixed and also that the joints (with the gaps) of the belt members fixed on the both ends of the roll substrate are formed at positions different from each other on the periphery of the roll substrate 109. Stated specifically, as shown in FIG. 1, it is preferred for a joint 110 of the belt member 18-1 and a joint 111 of the belt member 18-2 to be formed at different positions on the periphery of the roll substrate 109 and for a joint 112 of the belt member 18-3 and a joint 113 of the belt member 18-4 to be formed at different positions on the periphery of the roll substrate 109. Thus, this makes it possible for one belt member to maintain the gap size in a good precision when the joint of the other belt member comes into touch with the periphery of the molding roll 104, and is very effective for controlling the gap variations.

Figure 8:
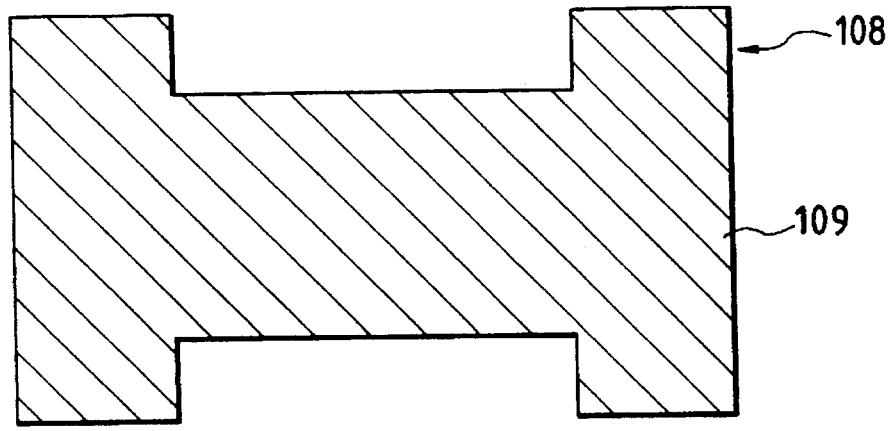
FIG. 8 is a schematic cross section of an embodiment of the roll substrate used in the apparatus shown in FIG. 1.

As another method by which the gap control means 108 according to the present invention is formed on the roll substrate 109, the part where the stamper member is fixed on the roll substrate may be cut as shown in FIG. 8 so that the roll substrate itself can serve as the gap control means 108.

Figure 9:
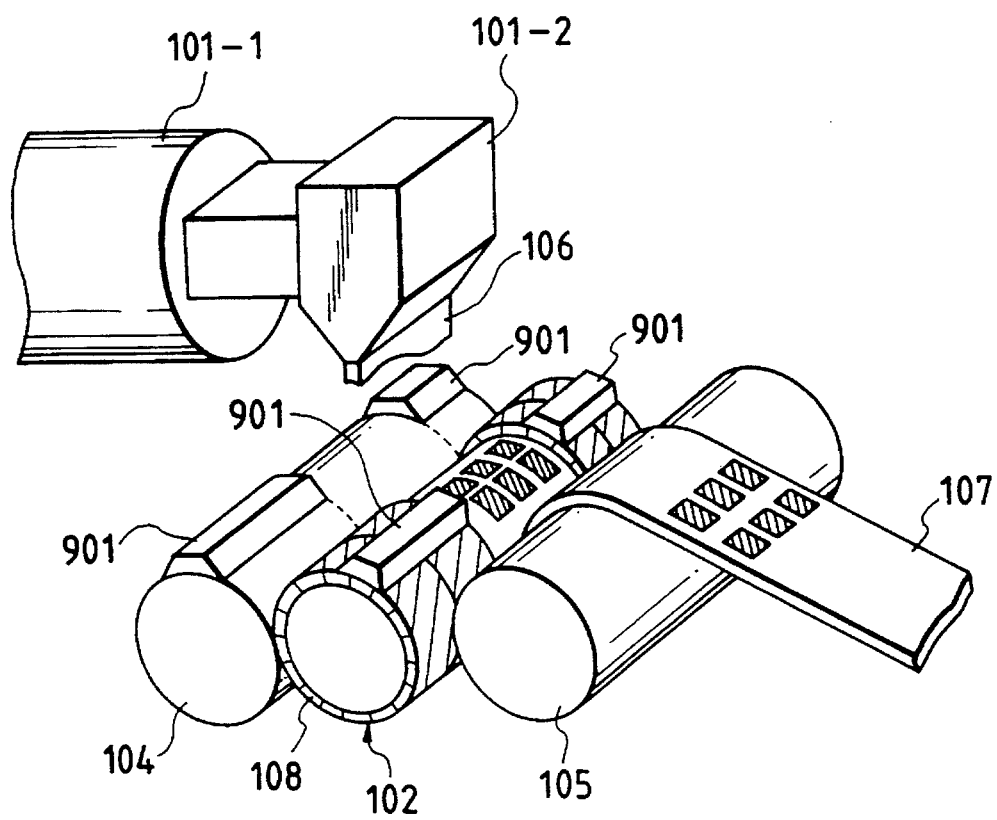
FIG. 9 is a schematic perspective view to illustrate another embodiment of the apparatus for manufacturing substrates for optical recording mediums according to the present invention.

In the present embodiment, as shown in FIG. 9, a cleaning means 901 may be provided, to clean the surface at which the molding roll 104 comes into touch with the gap control means 108 and the surface at which the gap control means 108 comes into touch with the molding roll 104. In such an instance, any fragments or the like of molding materials can be prevented from being caught between the molding roll 104 and the gap control means 108, so that the gap variations can be further decreased. The cleaning means 901 may preferably be a means that can remove dust such as resin pieces having adhered to the periphery of the molding roll 104 and the surface at which the gap control means 108 comes into touch with the molding roll 104, and also may cause no scratches on the surfaces to be cleaned. For example, a wiping member may be brought into touch with the surface to be cleaned, or air may be blown thereto, any means of which can be used. In particular, the use of the wiping member is preferred because it has no influence on the heat balance between the thermoplastic resin sheet, the molding roll and the roll stamper.

Materials usable for the wiping member may include polyolefin resins such as polyethylene, polypropylene end polytetrafluoroethylene, polyester resins, polyamide resins, epoxy resins, polyurethane resins, polyacrylic resins, polyvinyl chloride resins, polystyrene resins, and phenol resins.

The wiping member may also be impregnated with a solvent such as acetone, alcohol or toluene so that the cleaning can be more efficiently carried out.

The pressure at which the wiping member is brought into touch with the surface to be cleaned may vary depending on the materials for the roll substrate and the material for the wiping member. In order to remove the resin but prevent the roll substrate from scratching remove the resin, the pressure may preferably be set in the range of from $9.8 \times 10^3$ to $1.96 \times 10^6$ Pa (0.1 $kg/cm^2$ to 20 $kg/cm^2$), and particularly from $4.9 \times 10^4$ to $9.8 \times 10^5$ Pa (0.5 to 10 $kg/cm^2$).

Figure 10:
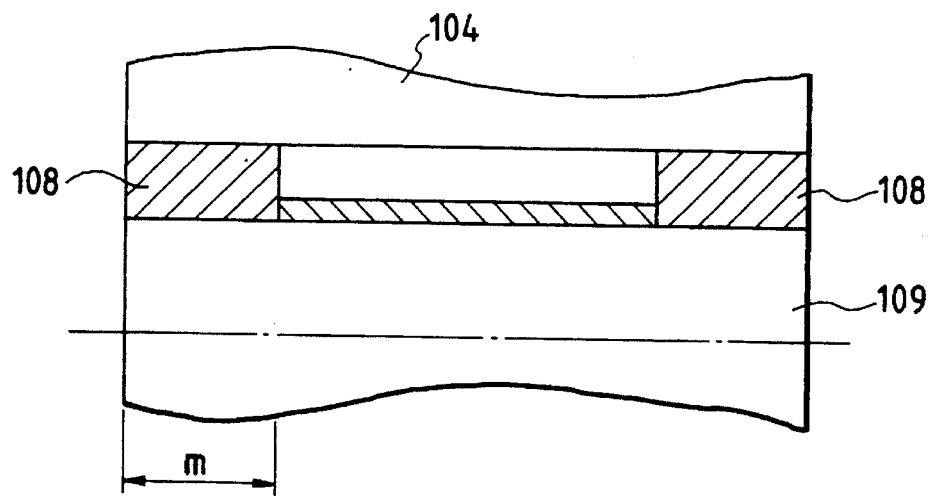
FIG. 10 illustrates definition of the width of the gap control means.

Meanwhile, in the present invention, the width of the gap control means may be as follows: In the case when the gap control means 108 is provided on each side of the thermoplastic resin sheet 106 as shown in FIG. 7, the total of length "m" (see FIG. 10) at the part where the molding roll 104 comes into contact with the gap control means 108 at their one-side ends may preferably be at least 1 cm or more, particularly from 1.5 cm to 10 cm. This makes it possible to maintain the gap size more accurately and also does not make the roll substrate large-sized.

In the present invention, the thickness "t" of the gap control means 108 may be as follows: For example, in the case when the stamper member 115 is fitted to the periphery of the roll substrate as shown in FIG. 7, the thickness may preferably be a thickness corresponding to the sum of the prescribed gap size "d" and the thickness "n" of the stamper member 115. In the case when the preformat pattern is directly formed on the periphery of the roll substrate 109 or when, as will be detailed later, the stamper member 115 wound around the roll substrate 109 and the gap control means 108 are integrally formed, the thickness "t" of the gap control means 108 may preferably be set so as to be substantially equal to the gap size "d".

Figure 11:
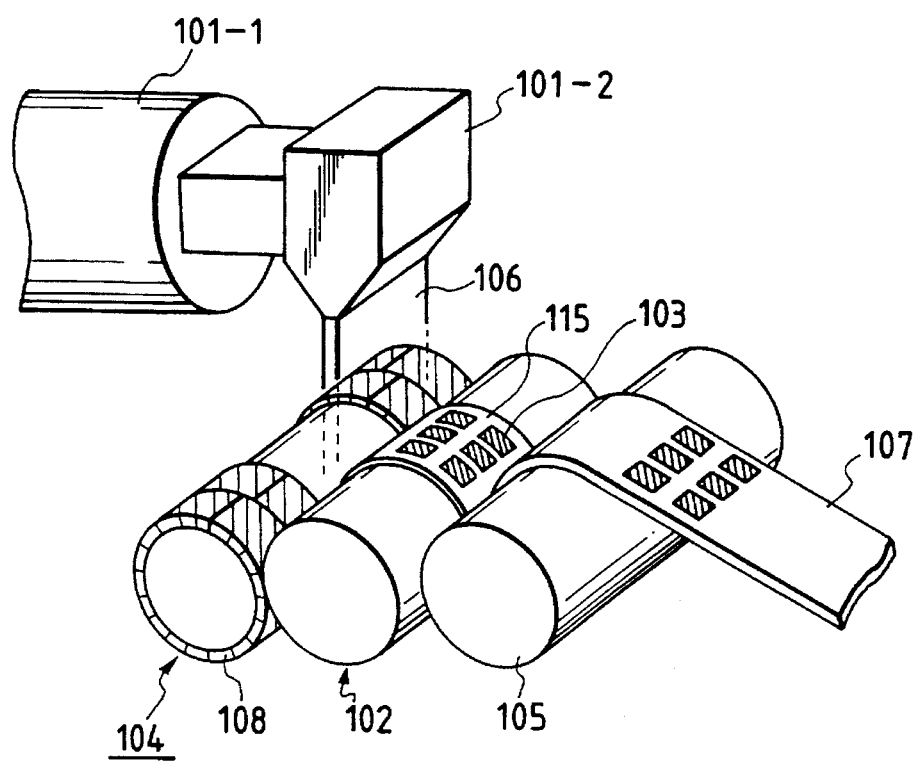
FIG. 11 is a schematic perspective view to illustrate still another embodiment of the apparatus for manufacturing substrates for optical recording mediums according to the present invention.

In the above embodiment of the present invention, the gap control means 108 has been described as the one provided on the side of the roll substrate 109 of the roll stamper 102 in all instances. In the present invention, as shown in FIG. 11, the gap control means 108 may alternatively be formed on the periphery of the molding roll 104, or may also be provided on both peripheries of the roll stamper 102 and the molding roll 104.

Figure 12:
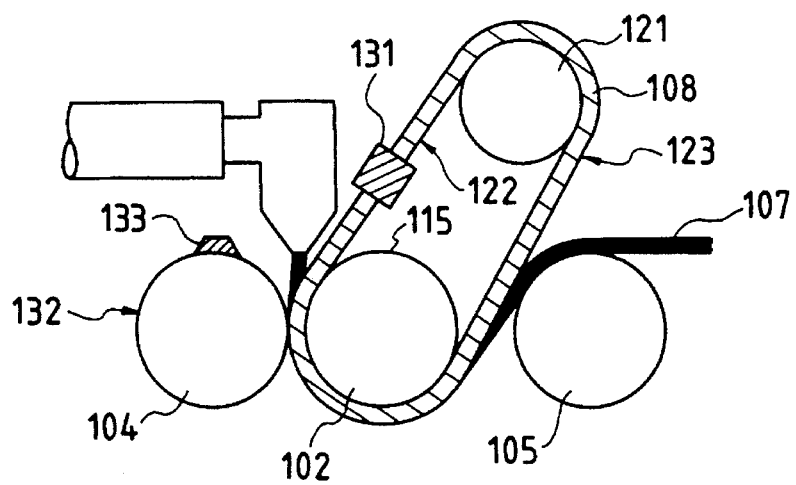
FIG. 12 is a schematic cross section to illustrate a further embodiment of the apparatus for manufacturing substrates for optical recording mediums according to the present invention.

FIG. 12 illustrates another embodiment of the process for manufacturing substrates for optical recording mediums according to the present invention.

The apparatus shown in FIG. 12 comprises a gap control means 108 formed of an endless belt member, and a pulley 121 provided so that the endless belt member is synchronized with the rotation of the roll stamper 102 and led in the gap between the molding roll 104 and the roll stamper 102 so that the molding roll 104 and the roll stamper 102 are brought into contact with each other through it.

The apparatus thus constructed makes it unnecessary to fix the gap control means 108 on the roll stamper 102 or the molding roll 104, or on the both of them, end is preferable because the gap size can be changed with ease when, for example, optical recording mediums with different thicknesses as are formed.

Figure 13:
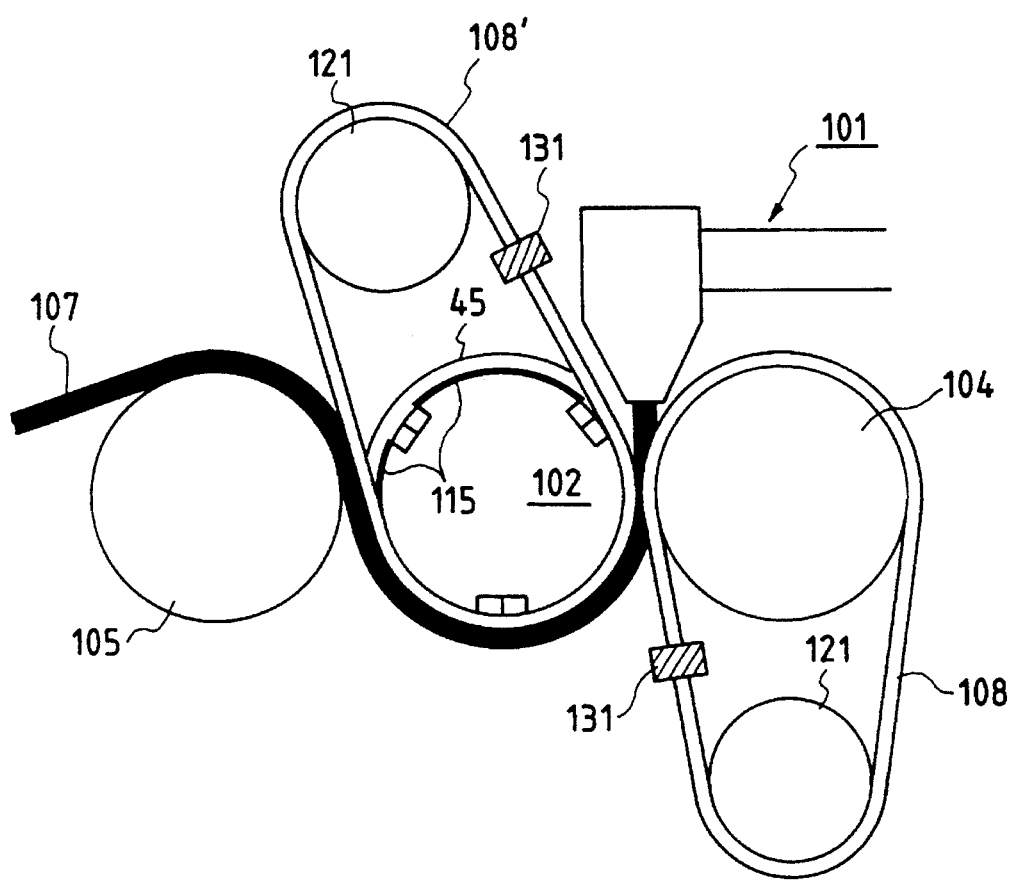
FIG. 13 is a schematic cross section to illustrate a further embodiment of the apparatus for manufacturing substrates for optical recording mediums according to the present invention.

With regard to this embodiment also, the gap control means 108 comprised of an endless belt member may be synchronized with the rotation of the molding roll 104, and also, as shown in FIG. 13, endless belt members may be synchronized with the rotation of both the roll stamper 102 and the molding roll 104 so that the roll stamper 102 comes into contact with the molding roll 104 through two gap control means 108'.

In the embodiment shown in FIG. 12, a cleaning means 131 for cleaning the gap control means 108 may also be used so that the surface at which the gap control means 108 comes into touch with the roll stamper 102 and the surface at which it comes into touch with the molding roll 104 can be cleaned. A cleaning means 133 may also be provided so that the surface at which the molding roll 104 comes into touch with the gap control means 108 can be cleaned with it.

In the embodiment shown in FIG. 13, each side of both the gap control means 108 and the gap control means 108' may be cleaned using the cleaning means 131, so that the gap variations can be made smaller.

Figure 14:
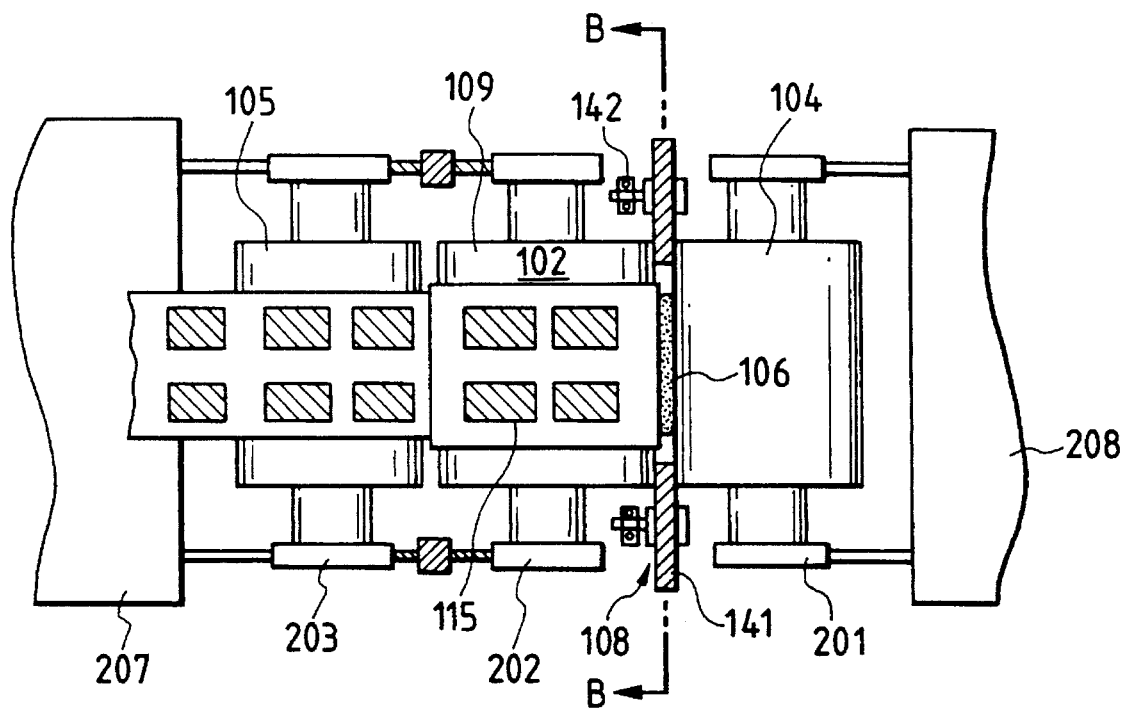
FIG. 14 is a schematic plan view to illustrate a still further embodiment of the apparatus for manufacturing substrates for optical recording mediums according to the present invention.
Figure 15:
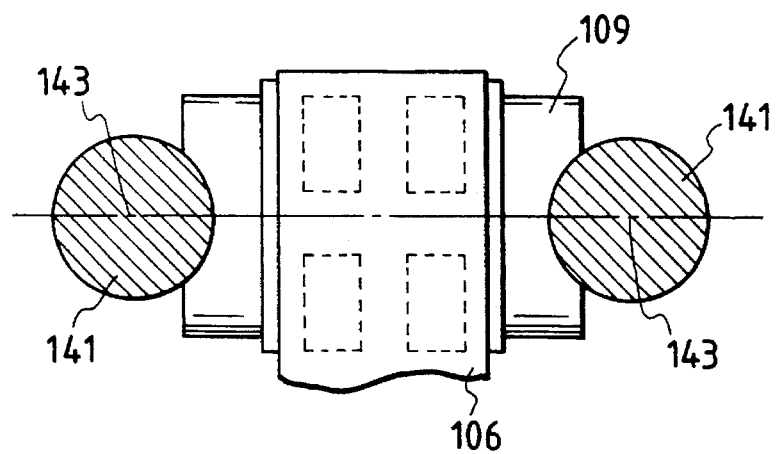
FIG. 15 is a cross section along the line B—B of the apparatus shown in FIG. 14.

FIG. 14 and FIG. 15, the latter being a cross section along the line B—B in the former, illustrate still another embodiment of the present invention. The apparatus shown in FIG. 14 comprises a gap control means 108 formed of a heat-resistant disk 141 having a given thickness, and a rotating means 142 for rotating the disk 141, which is rotated as the roll stamper 102 and the molding roll 104 are rotated and is provided so as to be caught between the roll substrate 109 of the roll stamper 102 and the molding roll 104 so that the roll stamper 102 is brought into contact with the molding roll 104 through the disk 141, thereby carrying out stamping molding of the thermoplastic resin sheet 106.

In this embodiment, it is preferable for the disk 141 to be provided so that its rotational center 143 is on the plane embracing the rotating shaft of the roll stamper 102 and the rotating shaft of the molding roll 104, whereby the rotation of the disk 141 and the rotation of the roll stamper 102 and molding roll 104 may be interfered with only with difficulty.

Figure 16:
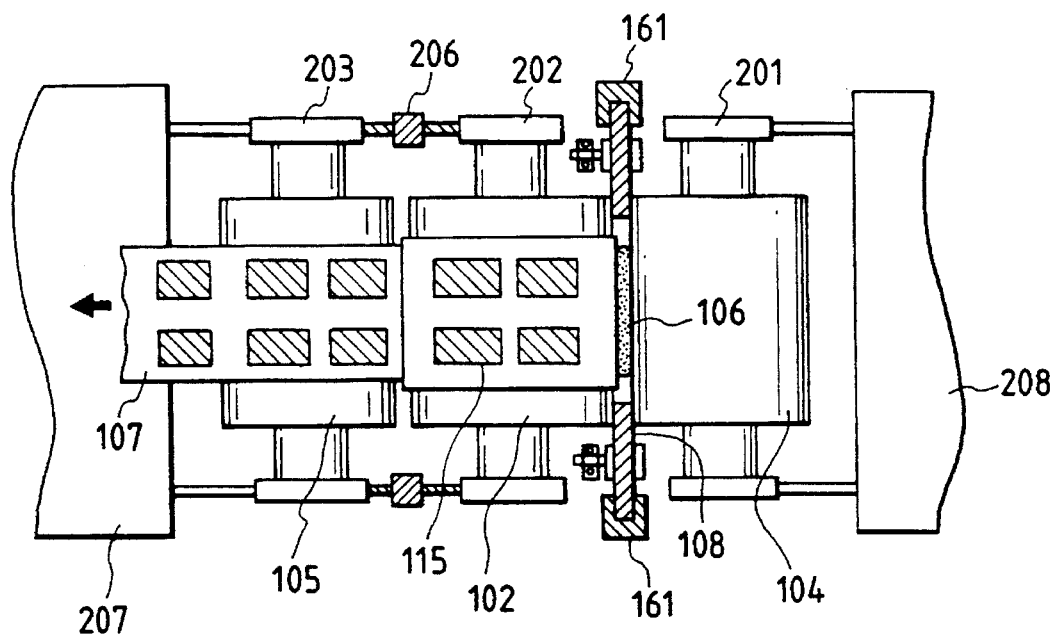
FIG. 16 is a schematic plan view to illustrate a still further embodiment of the apparatus for manufacturing substrates for optical recording mediums according to the present invention.

In the apparatus thus constructed, the stamping molding may be carried out on the thermoplastic resin sheet 106 while the surfaces at which the disk 141 comes into touch with the roll substrate 109 and the molding roll 104 are cleaned using a cleaning means 161 as shown in FIG. 16. This is preferable in view of the advantage that the gap variations can be made smaller.

Figure 23A:
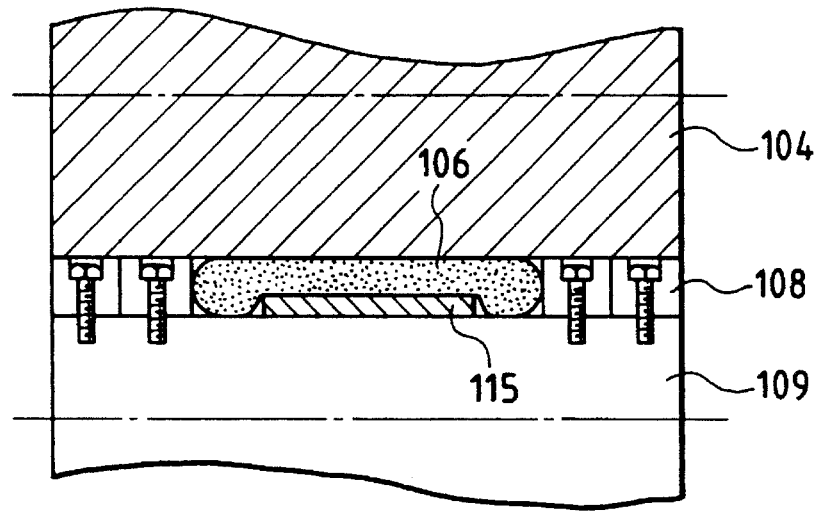
FIG. 23A is a partial cross section of the part where the resin is pressed between a roll and a stamper, of a conventional apparatus for manufacturing substrates for optical recording mediums.
Figure 23B:
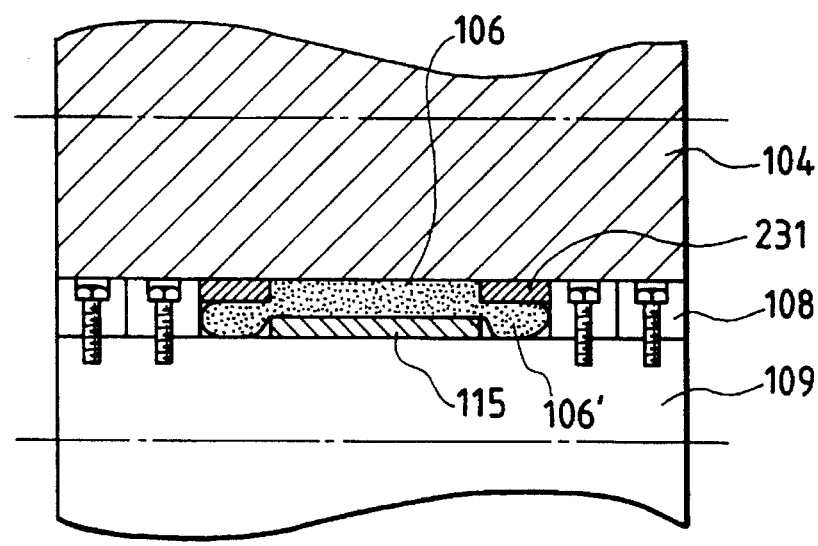
FIG. 23B is a partial cross section of the part where the resin is pressed between a roll and a stamper, of the apparatus for manufacturing substrates for optical recording mediums according to the present invention.

Meanwhile, in the above embodiment of the present invention, as shown in FIG. 23A, the stamper member 115 fixed on the periphery of the roll substrate 109 may be so formed as to have a width smaller than the width of the thermoplastic resin sheet 106. In such an instance, as shown in FIG. 23B, a press contact member 231 may preferably be provided so that the edges 106' of the resin sheet that do not come into contact with the stamper member 115 can be brought into pressure contact with the surface of the roll substrate 109 or molding roll 104. More specifically, the edges of the resin sheet are brought into pressure contact with the periphery of the roll substrate 109 or molding roll 104 by the action of the press contact member 231 and cooled, so that the resin at the edges can be prevented from protruding to the surface at which the molding roll 104 comes into contact with the gap control means 108 and hence the gap size can be uniformly maintained even when the stamping molding is continuously carried out for a long time.

Figure 24:
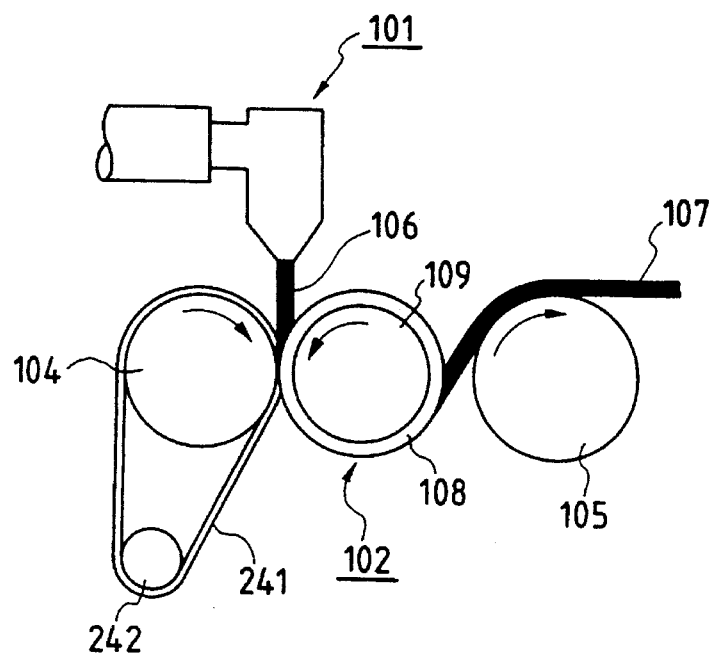
FIG. 24 is a schematic cross section to illustrate a still further embodiment of the apparatus for manufacturing substrates for optical recording mediums according to the present invention.

This press contact member 231 may be provided along the periphery of the roll substrate 109, the periphery of the molding roll 104 or the peripheries of both so long as the edges of the resin sheet 106 can be brought into pressure contact. Alternatively, as shown in FIG. 24, an endless belt member 241 may be used as the press contact member as in the case of the gap control means 108, where the endless belt member 241 is provided so as to be led to the gap between the molding roll 104 and the roll stamper 102 by means of a pulley 242 as the molding roll 104 is rotated, so that the edges of the resin sheet 106 are brought into pressure contact with the surface of the roll substrate 109.

Figure 17:
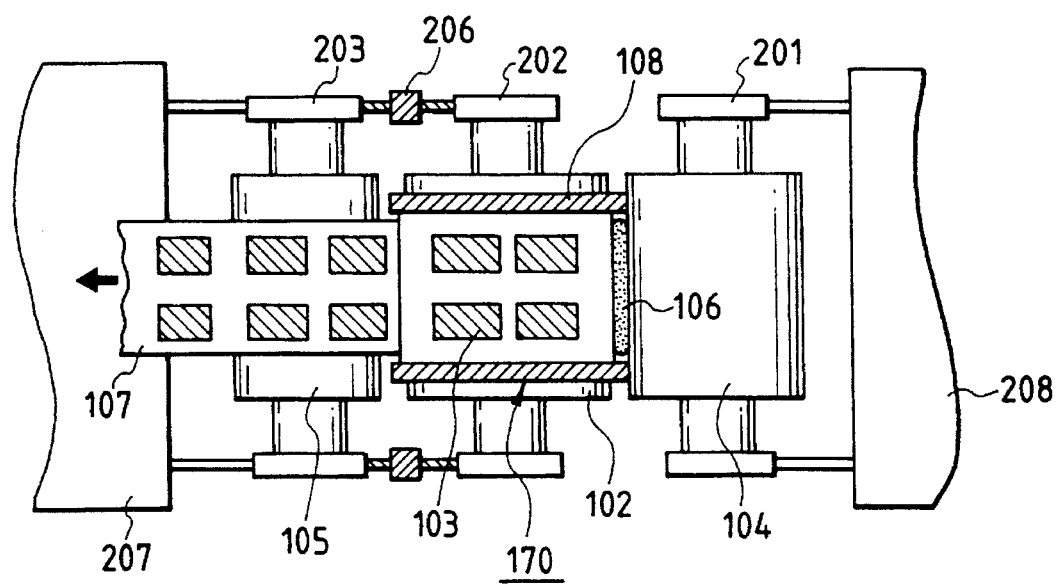
FIG. 17 is a schematic plan view to illustrate a still further embodiment of the apparatus for manufacturing substrates for optical recording mediums according to the present invention.

FIG. 17 illustrates a further embodiment of the apparatus used in the process for manufacturing substrates for optical recording mediums according to the present invention. The apparatus shown in FIG. 17 comprises a gap control means 108 provided on a stamper member 170 fixed on the periphery of the roll substrate 109, in its region not coming into contact with the thermoplastic resin sheet 106.

Figure 18A:
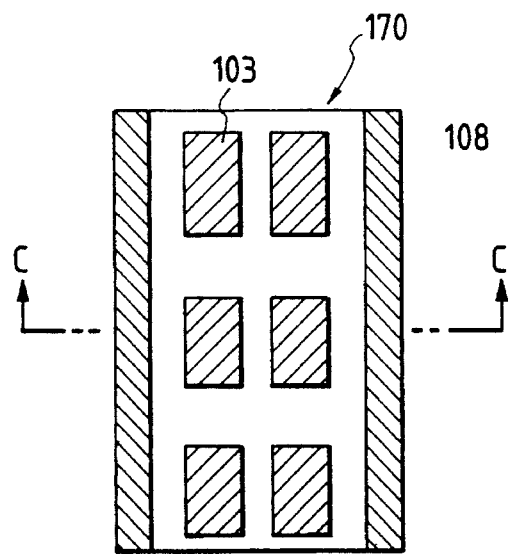
FIG. 18A is a plan view of the stamper used in the apparatus shown in FIG. 14.
Figure 18B:
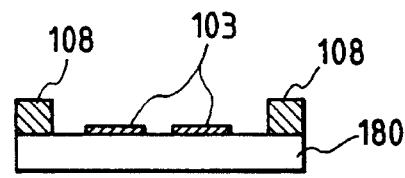
FIG. 18B is a cross section along the line C—C in FIG. 18A.

FIG. 18A is a schematic plan view of the stamper member 170 shown in FIG. 17, and FIG. 18B is a cross section along the line C—C in FIG. 18A.

The stamper member 170 in the present embodiment can be prepared by, for example, a method in which the gap control means as described above is fixed, using an adhesive or screws, in a region not coming into contact with the thermoplastic resin sheet on a stamper member 180 formed by a conventional method, having a preformat pattern 103 on its surface. In the present embodiment, the gap control means may be fixed on the stamper member 180 at any time before the stamper member 180 is fitted to the roll substrate 109 or after the stamper member 180 has been fitted to the roll substrate 109.

The stamper member 170 according to the present embodiment may also be prepared according to, for example, the steps as shown in FIGS. 31A to 31F, where the stamper member and the gap control means 108 are integrally formed.

More specifically, on a base disk 311 on which a preformat pattern has been formed, a specular plate 313 is provided via a spacer 312 having a thickness equal to the gap size "d", in the manner that its specular surface faces the preformat pattern 103. A cell 314 is thus made up. Thereafter, the inside of the cell is packed with a photocurable resin, followed by curing to form on the specular plate a mother stamper member 316 having a resin layer 315 to which the preformat pattern has been transferred. Next, the surface (including the bared areas of the specular plate 313) of the mother stamper member 316 is made conductive, followed by electroforming to form an electroformed film 317. The electroformed film 317 is peeled from the mother stamper member 316, so that a stamper member 318 on which the gap control means 108 has been integrally formed can be obtained.

Meanwhile, when the roll stamper 102 is formed using the stamper member 170 according to the present embodiment, another gap control means 194 may preferably be provided across both ends of the stamper member wound around the roll substrate.

Figure 19:
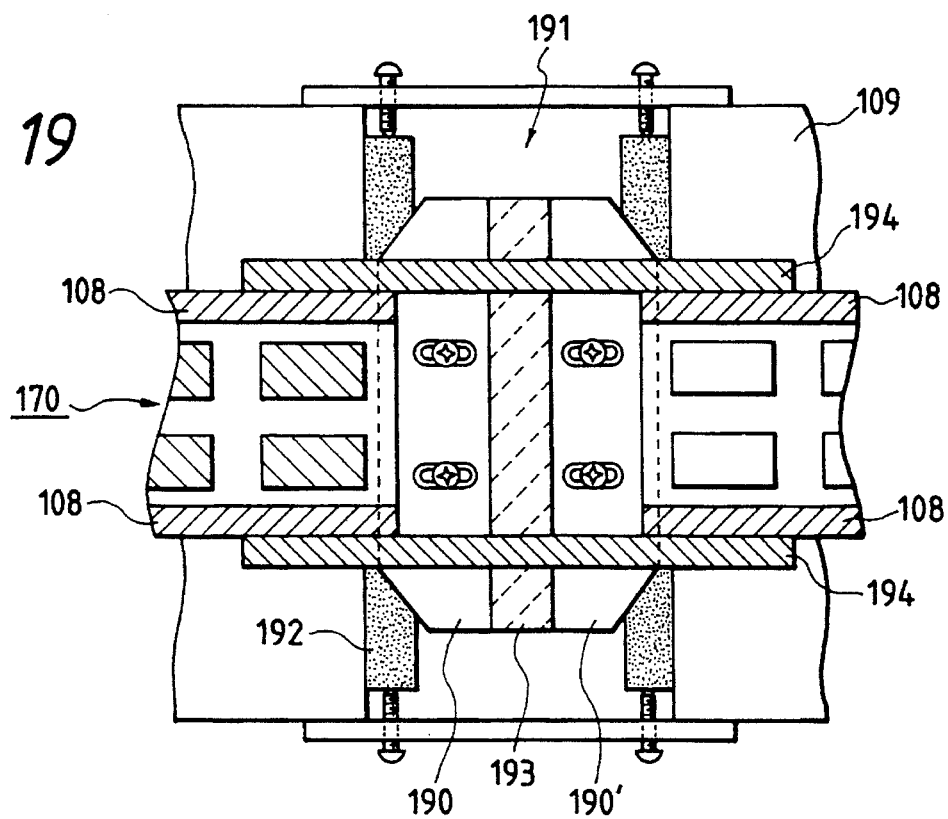
FIG. 19 is a partial enlarged plan view to illustrate a still further embodiment of the apparatus for manufacturing substrates for optical recording mediums according to the present invention.
Figure 20:
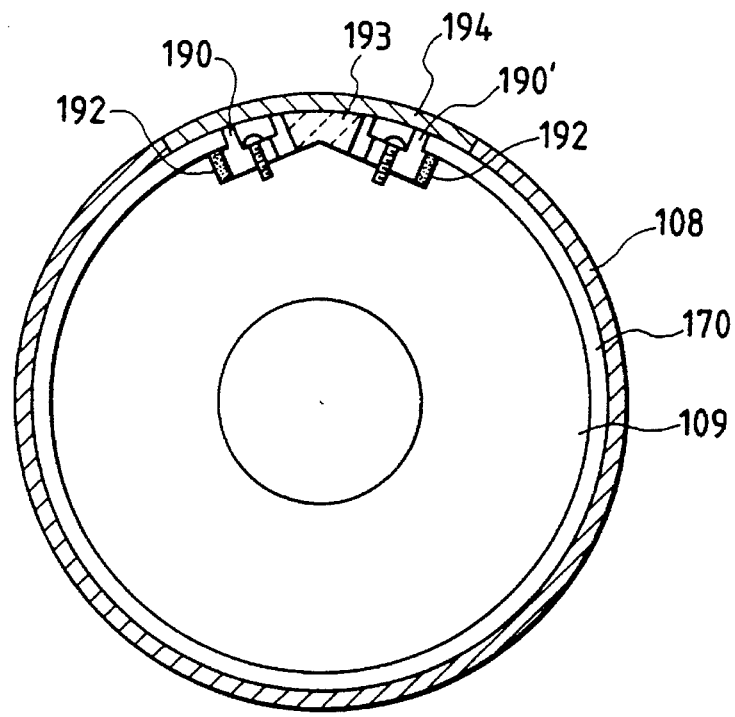
FIG. 20 is a cross section in the direction laying at right angles to the rotating shaft of the roll stamper shown in FIG. 19.

More specifically, a method of fixing the stamper member 170 on the roll substrate 109 is exemplified by the disclosure in Japanese Patent Application No. 3-97909(Laid-Open Application No. 4-307223), filed by the present applicant, according to which, as shown in FIG. 19 and FIG. 20, the latter being a cross section of the former, fixing members 190 and 190' are secured to the back of a stamper member 170. Meanwhile, in the roll substrate 102, an engageable groove 191 to which the fixing members 190 and 190' can be fittingly inserted is formed in parallel to the axial direction of the roll substrate 109. The fixing members 190 and 190' are fittingly inserted to the engageable groove 191 and also wedges 192 are respectively inserted between the fixing members 190 and 190' and walls of the engageable groove 191 to apply a tension to the stamper member 170 so that the stamper member 170 can be fixed on the roll substrate 109 so as to be in close contact with the periphery thereof. In such an instance, it is preferred that the space between the fixing members 190 and 190' are filled with a resin 193 or the like and also an additional gap control means 194 is fixed on the periphery of the roll substrate 109 across both ends of the stamper member in the manner that it overlaps with the gap control means 108 of the stamper member 170 on the widthwise outer sides of the stamper member 170. This makes it possible to make gap variations very small in the vicinity of the fixing members for fixing the stamper member 170 on the Poll substrate 109.

Figure 21:
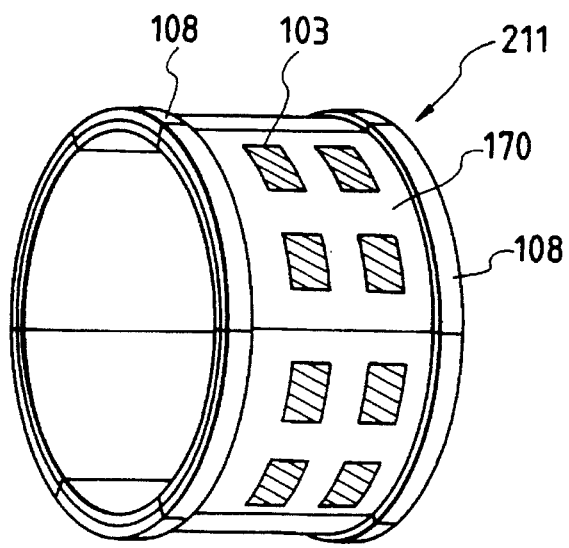
FIG. 21 is a schematic perspective view of an endless stamper usable in a still further embodiment of the apparatus for manufacturing substrates for optical recording mediums according to the present invention.
Figure 22:
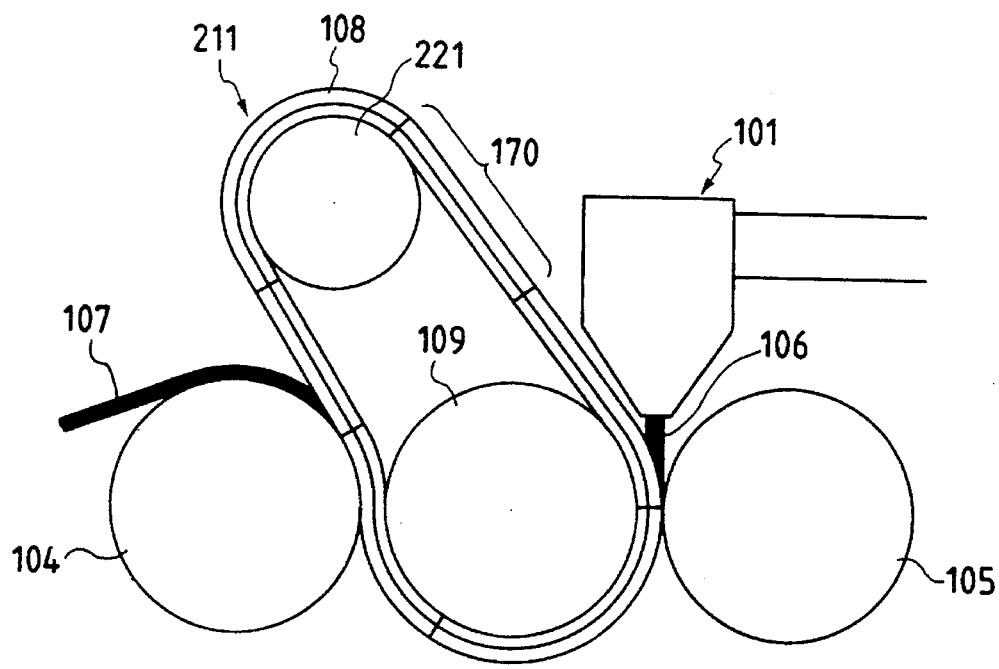
FIG. 22 is a schematic perspective view of an apparatus for manufacturing substrates for optical recording mediums according to the present invention in which the endless stamper shown in FIG. 21 is used.

The stamper member 170 having this gap control means 108 may be prepared in plural sheets, and the ends thereof may be joined using a means such as welding to provide an endless stamper 211 as shown in FIG. 21. Then, as shown in FIG. 22, using a pulley 221, the endless stamper 211 may be so provided as to synchronize with the rotation of a roll substrate 109 and to be caught between the molding roll 104 and the roll substrate 109 so that the stamping molding of the thermoplastic resin sheet 106 can be carried out while bringing the roll substrate 109 into contact with the molding roll 104 through the gap control means 108.

As a method for preparing such an endless stamper 211, stamper members having no gap control means 108 may be joined to produce an endless stamper and thereafter a belt made of stainless steel (which may be an endless belt) serving as the gap control means may be fixed on each side edge, whereby the endless stamper as shown in FIG. 21 can also be obtained.

Figure 25A:
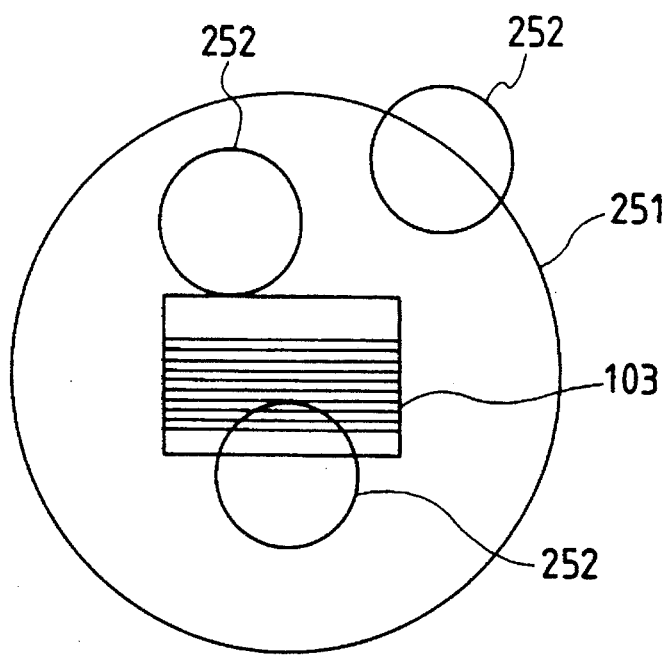
FIGS. 25A and 25B illustrate how to measure the surface precision of the stamper according to the present invention.
Figure 25B:
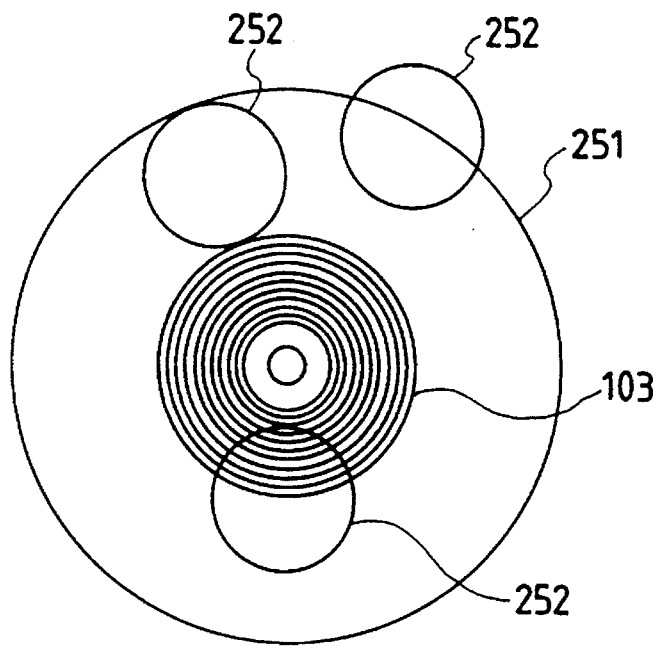

As the roll stamper 102 used in the extrusion stamping molding, the roll stamper comprising a roll substrate provided with a preformat pattern directly formed along its periphery or the roll stamper comprising a roll substrate fitted thereon with a stamper member having a preformat pattern is used as described above. The roll stamper comprising a roll substrate fitted thereon with a stamper member is preferably used because the stamper member can be replaced with ease if the preformat pattern has been broken. When, however, the apparatus as shown in FIG. 1 or 4 is set up using such a roll stamper, the gap variation depends also on the surface precision of the stamper member fixed on the periphery of the roll substrate. Thus, in order to manufacture, using the technique of extrusion stamping molding, high-quality substrates for optical recording mediums having a superior transfer precision of preformat patterns, a low birefringence and also a superior thickness precision preferable for achieving uniform reproducing signals, it is preferable to control the gap variation so as to be 30 µm or less, particularly 20 µm or less, and more particularly 10 µm or less. In order to achieve the gap variation of 30 µm or less, the surface precision (flatness) of a stamper member may preferably be as follows: For example, as shown in FIGS. 25A and 25B, a circular region 251 completely embracing a preformat pattern for a sheet of optical card or optical disk and also having an area about 12 times as large as the area of the preformat pattern has a surface precision of 15 µm or less, particularly 10 µm or less, and more particularly 5 µm or less, and also circular regions 252 of 50 mm in diameter, each having the center at any position within the above region 251, have a surface precision of 5 µm or less, and particularly 3 µm or less.

Figure 26A:
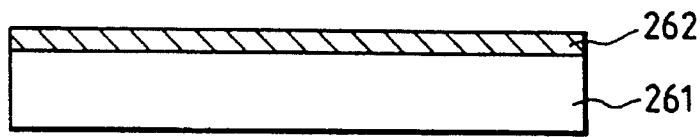
FIGS. 26A to 26D illustrate a process for preparing a conventional stamper.
Figure 26B:
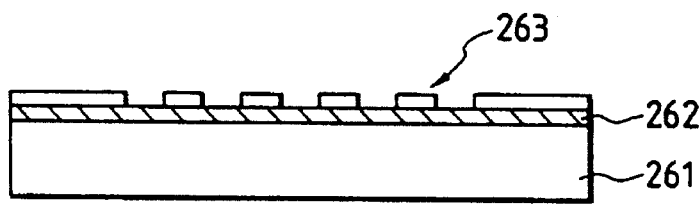
Figure 26C:
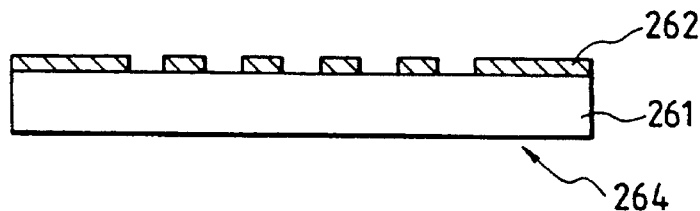
Figure 26D:

Meanwhile, as a process for preparing a stamper for molding optical recording mediums, there is a conventionally known process comprising the steps of forming a photoresist layer on a substrate, subjecting the resist layer to selective exposure and development to form a resist pattern, subsequently providing a conductive film on this resist pattern, followed by electroforming, and finally peeling the resulting electroformed film and the conductive film together from the resist pattern to give a stamper. Besides this process, there is also a process comprising the steps of, as shown in FIG. 26, forming a pattern forming layer 262 on a substrate 261 (FIG. 26A), subsequently forming a resist pattern 263 on the pattern forming layer 262 by photolithography (FIG. 26B), subsequently etching the pattern forming layer 262 to form a master stamper 264 (FIG. 26C), subjecting this master stamper 264 directly to electroforming, or making a replica of this master stamper by the use of a photocurable resin or the like and subjecting the replica to electroplating, to obtain a stamper 265 (FIG. 26D).

The latter process enables repeated use of the master stamper, and hence has a superior mass productivity of stampers. At the same time, this process can achieve a superior pattern precision or a superior uniformity in the depth of the engraved portion in the preformat comprised of the raised and engraved portions, and is most suited for preparing stampers for optical recording mediums.

It, however, is difficult for this process to prepare master stampers with a small strain and hence difficult to prepare stampers with a good surface precision. In particular, in the case of the stamper comprising a stamper member having on its surface a plurality of preformat patterns for optical recording mediums, it is very difficult to achieve the surface precision stated above. On the other hand, a master stamper formed through the following process has a very small strain, which process is a process comprising the steps of:

forming a pattern forming layer on the surface of a substrate;

forming a positive resist layer on the pattern forming layer;

selectively exposing the positive resist layer in accordance with a preformat pattern of an optical recording medium and at the same time exposing the resist layer other than that in the region in which the pattern is formed;

developing the resist layer to form a resist pattern; and etching the pattern forming layer, using the resist pattern as a mask.

Preparation of a stamper by using this master stamper makes it possible to obtain a stamper with a very high flatness, i.e., enough to satisfy the surface precision stated above.

The reason why the stamper with less strain can be obtained by this process is unclear. However, it can be presumed as follows:

The master stamper is prepared, as described above, by forming, e.g., a chromium thin film as the pattern forming layer on a substrate having a high surface precision, thereafter coating a photoresist on the chromium thin film, followed by flood exposure using a photomask having a pattern corresponding to the preformats of optical cards or optical disks or track-by-track exposure using electron rays to print to the photoresist layer the preformat pattern corresponding to plural sheets of optical recording mediums, thereafter developing the resist layer to form a resist pattern, and then etching the chromium thin film not covered with the resist.

Figure 27A:
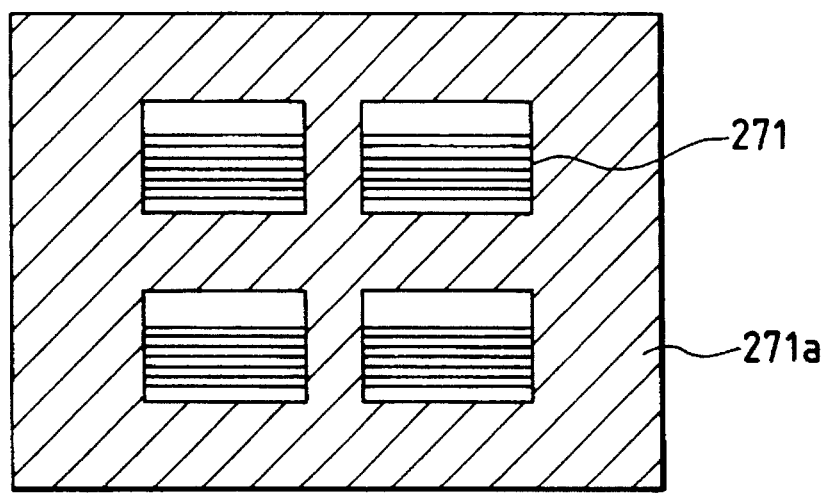
FIG. 27A illustrates the region in which a stamper for optical cards is exposed to light.
Figure 27B:
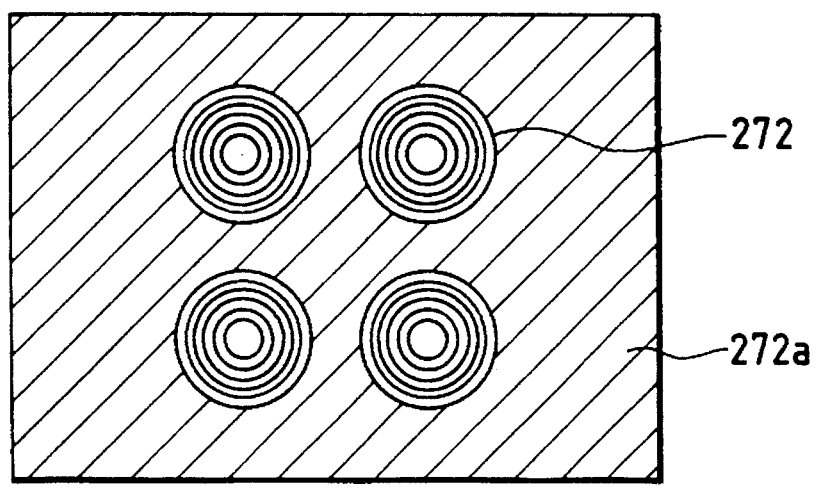
FIG. 27B illustrates the region in which a stamper for optical disks is exposed to light.
Figure 28A:
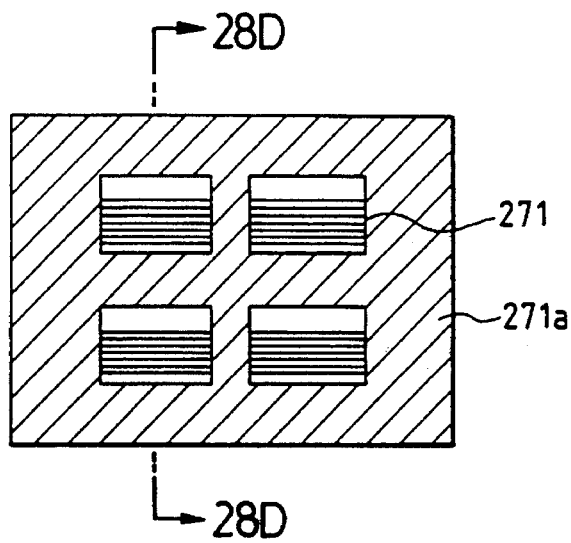
FIG. 28A is a plan view of a conventional stamper.
Figure 28B:
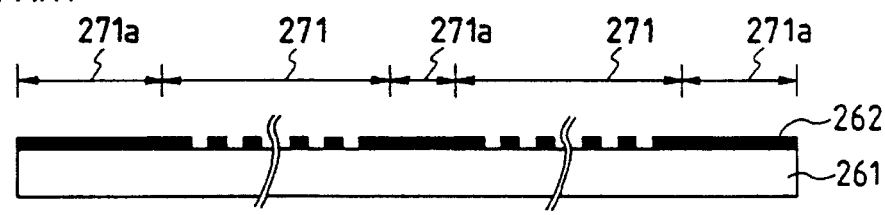
FIG. 28B is a cross section along the line D—D in FIG. 28A.

Meanwhile, the photoresist used for the preparation of the master stamper for optical recording mediums is usually a positive photoresist having an excellent resolution. Hence, the chromium thin film formed in the region where the photoresist layer is not exposed in the above process for preparing the master stamper, i.e., the region as exemplified by a region 271a outside the pattern regions 271 of an optical card shown in FIG. 27A, which illustrates exposure regions, or a region 272a present outside pattern regions 272 of an optical disk shown in FIG. 27B, remains as it is as shown in FIG. 28B, which is a cross section of the line D—D in FIG. 28A schematically showing a plan view of the master stamper finally obtained.

Since, however, the chromium thin film is usually produced by sputtering of chromium on a polished glass substrate under such conditions as to cause no tensile stress or compression stress to prevent the glass substrate from warping when the film is formed on one side of the glass substrate, the chromium is partly removed by etching in the region in which the preformat pattern is formed, and therefore the stress kept balanced until that time becomes imbalanced in the chromium thin film formed in the vicinity of the pattern, resulting in lack of stress balance, and consequently causing a strain in the master stamper. On the other hand, in the process for preparing a master stamper according to the present invention, the chromium thin film formed in the region 271a or 272a is removed to make the substrate surface bare in this region, so that the influence of stress the chromium thin film may have on the substrate can be greatly reduced. Thus, it is presumed that any strain produced in the master stamper can be made smaller.

The process for preparing a master stamper according to the present invention will be described below in detail with reference to the drawings.

The master stamper of the present invention can be prepared in the following way:

First, on a glass substrate whose surface has been polished to improve its surface precision, a metal as exemplified by chromium is deposited by a method such as vacuum deposition or sputtering to form a film as a pattern forming layer in a thickness corresponding to the depth of information track grooves or information pits (usually a thickness of from 500 to 5,000 Å is preferable). Next, a positive photoresist layer is superposed on the pattern forming layer and thereafter the photoresist layer is subjected to pattern exposure or irradiation with electron rays corresponding to the tracking grooves or information pits. In this case, the region 271a or 272a outside the regions of the optical card pattern 271 or optical disk pattern 272 shown in FIG. 27A or 27B is also subjected to the exposure or irradiation with electron rays. Thereafter, development is carried out to remove the resist in the region subjected to the exposure or irradiation. There are no particular limitations on the manner by which the photoresist layer is formed. A photoresist should preferably be applied by spin coating. The photoresist layer should preferably be in a thickness of from 500 to 1,500 Å. If it has a layer thickness of less than 500 Å, the thin film with a uniform thickness is difficult to form by the spin coating, and defects such as pinholes tend to occur.

After the development, the chromium thin film not covered with the photoresist is etched away. The etching is carried out in a depth corresponding to the thickness of the chromium thin film, and well carried out so that the glass substrate surface can be completely laid bare.

Figure 29:
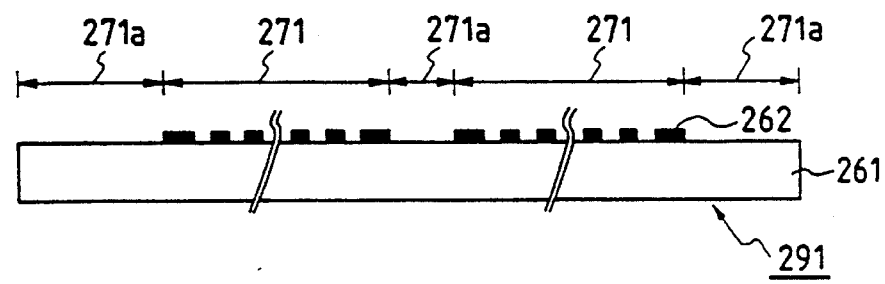
FIG. 29 is a cross section of the stamper according to the present invention.

Next, the remaining resist thin film is removed to obtain a master stamper 291 of the present invention, having a cross section as shown in FIG. 29.

The master stamper according to the present invention, thus obtained, is subsequently used in the preparation of the stamper for molding substrates for optical recording mediums.

The stamper can be prepared from the master stamper by a process including, as previously described, a process comprising forming a conductive film on the surface of the master stamper, thereafter forming an electroformed film on the conductive film, and then separating the electroformed film together with the conductive film from the master stamper to obtain a stamper, and a process comprising making a replica of the master stamper by the use of a photocurable resin, forming a conductive film on the surface of the replica, thereafter forming an electroformed film on the conductive film, and then separating the electroformed film together with the conductive film from the replica to obtain a stamper.

When the stamper thus obtained is used as the stamper member 115 constituting the roll stamper 102 of the apparatus for manufacturing substrates for optical recording mediums by extrusion stamping molding, making use of the gap control means 108 previously described, the gap variation can be controlled to be 30 μm or less, and further 20 μm or less, so that it becomes possible to mass-produce substrates for optical recording mediums with a very high quality.

Figure 30:
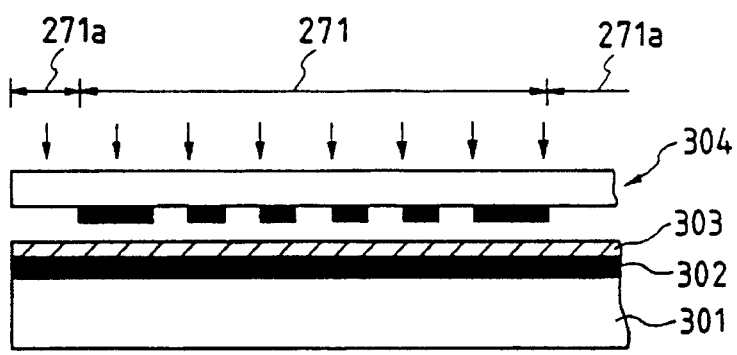
FIG. 30 illustrates an instance in which the stamper according to the present invention is used as a photomask.

In the master stamper prepared by the process described above, a product in which the substrate is replaced by a transparent substrate (e.g., glass) and the pattern forming layer is formed of a light-screening material (e.g., chromium) can also be preferably used as a photomask. More specifically, for example, as shown in FIG. 30, when a photoresist layer 303 that covers a pattern forming layer 302 formed on a substrate 301 is subjected to exposure in the steps for preparing the master stamper described above, a master stamper 304 previously prepared by the process of the present invention, which is usable as the photomask, is provided on the photoresist layer, followed by exposure, whereby the preformat pattern can be accurately printed on the resist layer because of a small strain produced in the photomask itself. At the same time, since no light-screening layer is formed in the regions 271a and 272a of the photomask, the exposure carried out on the regions 271a and 272a of the photomask can be carried out at the same time when the preformat pattern is printed, so that master stampers having a good surface precision and also more improved in pattern precision can be prepared with good efficiency.

In the steps for preparing the substrates for optical recording mediums, the surface temperature of the roll stamper 102 and the molding rolls 104 and 105 may vary depending on the resin used. When, for example, polycarbonate is used, the roll stamper 102 may usually be set at a temperature of from 110° C. to 145° C., the molding roll 104 from 90° C. to 135° C., and the molding roll 105 from 120° C. to 150° C., taking account of the heat deformation temperature of the polycarbonate. When an amorphous polyolefin is used, the roll stamper 102 may be set at a temperature of from 120° C. to 145° C., the molding roll 104 from 100° C. to 135°, and the molding roll 105 from 120° C. to 150° C.

These roll temperatures may be controlled, for example, using a heater casted in each roll or by circulating a heating medium through the center of each roll.

In the present invention, the resin used as a material for the resin sheet or substrate sheet 106 is a thermoplastic resin, and may preferably be those having a high transmittance to the light for recording and reproducing, including, for example, acrylic resins, polyester resins, polycarbonate resins, vinyl resins, polysulfone resins, polyolefin resins and cellulose derivatives, In the present invention, the molding rolls 104 and 105 and the roll substrate 109 of the roll stamper 102 may preferably be made of materials having a high hardness, having a good heat conductivity and capable of being readily mirror-finished. For example, steel, chrome steel, aluminum, mold steel (maraging steel) and so forth can be used.

The thermoplastic resin (a molten resin sheet) having been stamping-molded between the roll stamper 102 and the molding rolls 104 and 105 is formed into a substrate sheet 107 for optical recording mediums. The substrate sheet 107 thus obtained is wound up on a roll and forwarded to the subsequent steps of forming a recording layer and/or a reflective layer, forming a protective layer, and forming a hard coat layer on the recording and/or reproducing light incident surface of the substrate sheet 107 for optical recording mediums. Alternatively, after the stamping molding of the substrate sheet 107 for optical recording mediums, the above steps may be carried out continuously.

The recording layer formed on the surface of the substrate sheet 107 for optical recording mediums, on the side on which the preformats have been transferred, may be comprised of, for example, an oxide of Te, Sb, Mo, Ge, V, Sn, etc., an inorganic compound such as Sn or $TeO_x$-Ge, a composite of a metal and an organic compound or inorganic sulfide, such as $TeCH_4$, $TeCS_2$, Te-styrene, Sn—$SO_2$, GeS—Sn or SnS—S, a material of a thermoplastic resin such as nitrocelluloce, polystyrene or polyethylene having particles of metal such as silver dispersed thereinto. Chalcogens, and also magnetic materials such as Tb—Fe—Co, Gd—Fe—Co, Tb—Fe—Co—Cr and Gd—Fe—Co—Cr, as well as organic coloring matters may also be used.

In the present invention, the preformat pattern may specifically include, for example, a pattern corresponding to tracking tracks for optical disks or optical cards, having the form of a spiral, concentric circles or stripes with a width of from 1 μm to 4 μm, a pitch of from 1 μm to 20 μm and a depth or height of from 200 Å to 5,000 Å, and a pattern corresponding to address pits with a width of from 0.6μm to 10 μm, a length of from 0.6 μm to 20 μm and a depth or height of from 200 Å to 5,000 Å. In the present invention, the address pits include those which form raised portions or engraved portions with respect to the surfaces of the substrates for optical recording mediums.

As described above, according to the present invention, the stamping molding is carried out by bringing the roll stamper into contact with the molding roll through the gap control means, whereby the gap variation can be made smaller even when a roll stamper and a molding roll each having a large eccentricity are used, so that molding stability can be improved and high-quality substrates for optical recording mediums having a superior sheet thickness precision can be manufactured at a low cost.

The present invention makes it unnecessary to use the conventional gap adjusting member, and hence the time in which the stamping molding becomes stable after the start-up of the apparatus can be shortened, making it possible to decrease the quantity of resins having been hitherto wasted.

The process for preparing a master stamper according to the present invention also makes it possible to obtain a master stamper with a superior surface precision.

Use of the master stamper prepared by this process also makes it possible to prepare a stamper having a superior surface precision. Use of the roll stamper comprising the roll substrate fitted thereon with this stamper having a superior surface precision also makes it possible to allow the gap variation to always be very small, e.g., not more than 30 μm, and particularly not more than 20 μm, so that substrates for optical recording mediums with a very high quality can be obtained at a low cost.

EXAMPLES

The present invention will be described below in greater detail by giving Examples. It should be noted that the present invention is by no means limited by these Examples.

Example 1

A photomask with the structure as shown in FIG. 29 was prepared in the following way.

On a mirror-polished quartz glass substrate 5 mm thick, 300 mm long and 350 mm wide, a 3,000 Å thick chromium thin film was formed by sputtering. This thickness corresponded to the depth of the preformat pattern. On the chromium thin film, a positive photoresist (trade name: AZ-1370; available from Hoechist Japan Ltd.) was further applied by spin coating in a thickness of 1,000 Å, followed by baking.

Next, on the resist layer, a preformat pattern corresponding to four optical cards as shown in FIG. 27A was printed using electron rays and at the same time the photoresist layer of the region 271a was also irradiated with electron rays.

Here, the optical preformats refer to a pattern comprised of tracking tracks 3 μm wide and 12 μm pitch, formed in stripes in a region 80 mm long and 40 mm wide in parallel to their longitudinal direction.

Next, the resist layer was developed using a developer (trade name: AZ-312 MIF ; available from Hoechist Japan Ltd.) to form a resist pattern.

Next, the optical card preformat pattern regions and the chromium thin film region outside the pattern were etched with 6N hydrochloric acid until the glass substrate became bare, followed by well washing and then drying. Subsequently, the remaining photoresist was removed by ashing by means of an oxygen plasma asher to obtain a photomask on which an optical card preformat pattern had been formed.

With regard to this photomask, its surface precision was measured on the basis of the number of interference fringes, using an interference refractometer (trade name: ZYGO Interference Refractometer, Mark III ; manufactured by Zygo Co.) to ascertain that the region of a circle of 200 mm diameter embracing each optical card pattern had a surface precision of 4.7 μm, and the regions of any three circles of 50 mm diameter having the center within the region of 200 mm in diameter all had a surface precision of 2.5 μm.

Next, using this photomask, a master stamper was prepared in the following way.

On a mirror-polished quartz glass substrate 5 mm thick, 300 mm long and 350 mm wide, a 3,000 Å thick chromium thin film was formed by sputtering. This thickness corresponded to the depth of the preformat pattern. To the chromium thin film, a positive photoresist (trade name: AZ-1370; available from Hoechist Japan Ltd.) was further applied by spin coating in a thickness of 1,000 Å, followed by baking.

Next, on the resulting resist layer, the above photomask was superposed in close contact, and exposure and development were carried out to form a resist pattern.

Here, the photoresist in the region corresponding to the region 271a in FIG. 27A was completely removed and the chromium thin film was laid bare.

Next, the chromium thin film not covered with the photoresist layer was etched with 6N hydrochloric acid until the glass substrate became bare, followed by well washing and then drying. Subsequently, the remaining photoresist was removed by ashing by means of an oxygen plasma asher to obtain a master stamper on which an optical card preformat pattern had been formed.

With regard to this master stamper, its surface precision was measured in the same manner as the above to ascertain that it had substantially the same surface precision as the photomask.

Next, on the pattern bearing surface of the master stamper, a glass sheet of 10 mm thick, 300 mm wide and 350 mm long was superposed via a spacer to produce a cell. On the surface of the glass sheet facing to the master stamper, a silane coupling agent (trade name: A-174; available from Nippon Unicar Co., Ltd.) was applied. Subsequently, the inside of the cell was filled with an acrylate type ultraviolet-curable resin, followed by curing to obtain a glass substrate to which a replica of the master stamper had adhered. This replica comprised of the ultraviolet-cured resin had a size of 10 mm thick, 280 mm wide and 330 mm long.

Next, on this replica, nickel was deposited by sputtering as a conductive layer in a thickness of 1,000 Å to form an electrode, followed by electroforming of nickel in a thickness of 250 μm. Subsequently, the nickel layer was mirror-polished to a thickness of 200 μm, and thereafter the nickel layer was peeled from the replica to obtain a stamper.

With regard to this stamper, its surface precision was measured in the same manner as that of the photomask to ascertain that it had the same surface precision as the master stamper.

Next, the stamper was cut using a laser to have a size of 240 mm wide and 300 mm long in outer shape. Here, the longitudinal directions of the parallel-line preformat pattern and the stamper were made parallel.

Subsequently, on the back of both lengthwise ends of the stamper, fixing members 10 mm thick, 15 mm wide and 400 mm long, having the cross-sectional shape as shown by reference numeral 190 in FIG. 20 and made of stainless steel were welded using an electron-beam welding device (trade name: EPM 6LB; manufactured by Mitubishi Electric Corp.) in the manner that it overlapped with the stamper in a width of 5 mm. Thus, three stampers (used as stamper members of the roll stamper) with fixing members were made ready.

Meanwhile, a roll material made of stainless steel was chrome-plated on its periphery and the resulting coating surface was mirror-finished in a surface roughness of 0.1 μm or less to form a roll substrate 109 of 310 mm diameter and 500 mm wide.

Subsequently, on the periphery of the roll substrate 109, the engageable grooves as shown by reference numeral 191 in FIG. 19 were formed at three places. Here, the engageable grooves were each formed in a depth of 10 mm, and in a length of 500 mm in the direction along the rotating shaft of the roll substrate. The distance on periphery between the engageable grooves adjacent to each other was set at 300 mm.

Next, the stamper fixing members were respectively fittingly inserted in the engageable grooves and also the wedges shown by reference numeral 192 in FIG. 19 were fitted to apply a tension to the stamper members, and then the fixing members were secured to the roll substrate with screws to fix the three stamper members on the periphery of the roll substrate.

Each stamper member was fixed on the periphery of the roll substrate in the manner that it is positioned at the middle of the roll substrate in its width direction.

Next, four belt members 15 mm wide, 945 mm long and 0.6 mm thick, made of stainless steel were made ready, and were wound two by two around both edges of the stamper members fixed on the periphery of the roll substrate and secured with screws to provide the gap control means 108. Thus, the roll stamper 102 as shown in FIG. 1 was obtained. Each set of the two belt members fitted to each end (108-1 and 108-2, and 108-3 and 108-4 in FIG. 1) were so provided that their joints were positionally different from each other by 10 mm.

Another roll material made of stainless steel was chrome-plated on its periphery and the resulting coating surface was mirror-finished in a surface roughness of 0.1 μm or less to form a molding roll 104 310 mm in diameter and 500 mm wide.

The roll stamper 102 and the molding roll 104, thus obtained, were fitted to the extrusion stamping molding apparatus as shown in FIG. 1, and also the pressure of the molding roll 104 against the roll stamper 102 was set at 120 kgf.

Any gap variation occurring when the roll stamper 102 was rotated once while controlling the roll stamper 102 so as to come into contact with the molding roll 104 through the gap control means 108 was measured using a laser gap meter (trade name: LS-3001; manufactured by Keyens Co.) to ascertain that it was 7 μm or less.

Next, while maintaining this pressure, a 230 mm wide molten resin sheet of a bis phenol-A type polycarbonate (trade name: S-2000R; available from Mitsubishi Gas Chemical Company, Inc.) was extruded from the die 101-2 to mold a 0.4 mm thick substrate sheet for optical cards.

As the conditions for stamping molding, the temperature of the die 101-2 was adjusted to 310° C., the surface temperature of the roll stamper 102° to 150° C., the molten resin sheet transport speed to 3 m/min, and the resin output from the die 101-2 to 18 kg/hour, and the extrusion stamping molding was continuously carried out for 5 hours.

With regard to the substrate sheet thus molded, an average value of birefringence at any 9 points within the preformat pattern transferred region, an average value of transfer precision at those points and the ± deflection from the predetermined thickness of the sheet (0.4 mm) within the preformat pattern region was examined. As a result, for the substrate sheet molded later than 30 minutes from the start of stamping molding, the substrate sheet thickness precision was as high as ±3 μm or less on the basis of the standard thickness of 0.4 mm, the transfer precision was 95% or more, and the birefringence was 10 nm or less. Thus, it was possible to obtain high-quality substrates for optical recording mediums.

In the present Example, the transfer precision was evaluated in the following way: Cross-sectional shapes in the direction perpendicular to track grooves at 15 points on the preformat pattern transferred region of the substrate sheet were observed using an electron beam surface profile analyzer (trade name: ESA-3000; manufactured by Erionix Co.), where the width of a land of the track groove transferred region of the substrate sheet was represented by a and the width of the bottom of a track groove of the stamper was represented by A, and the transfer precision was evaluated as a value of a/A.

The birefringence was measured with the light of 830 nm in wavelength and 1 μm in spot diameter, using a polarimeter (trade name: SP-224 Type; manufactured by Sinko Seiki K.K.), and was evaluated as a value of single pass.

Comparative Example 1

The roll stamper 102 in Example 1 from which the gap control means 108 had been removed and the same molding roll 104 as used in Example 1 were applied as the roll stamper 401 and the molding roll 402 of the apparatus shown in FIG. 5, and the gap adjusting member 504 was used to adjust the gap size between the stamper surface of the roll stamper 401 and the periphery of the molding roll 402 to 0.4 mm. Here, the gap variation occurring while the roll stamper 401 and the molding roll 402 were rotated at an equal angular velocity was measured in the same manner as in Example 1 to find that it was 70 μm.

Next, using this apparatus, extrusion stamping molding of a substrate sheet for optical recording mediums was continuously carried out for 5 hours in the same manner as in Example 1.

The substrates thus molded were examined in the same manner as in Example 1. As a result, the sheet thickness precision greatly fluctuated within the range of from 0.36 to 0.44 mm which is the standard of thickness precision of substrates for optical cards. The birefringence was unstable with fluctuation within the range of from 10 to 40 nm, and the transfer precision was also unstable with fluctuation within the range of from 0.7 to 0.96.

Comparative Example 2

For the roll stamper 401 shown in FIG. 5, a roll substrate which causes a gap variation of 10 μm when used in combination with the molding roll 402 was made ready. Then the stamper members prepared in the same manner as in Example 1 were fitted to the periphery of the roll substrate to obtain the roll stamper 401.

Then, the gap variation occurring between the stamper surface of the roll stamper 401 and the periphery of the molding roll 402 was again measured to reveal that it was 15 μm.

Next, using this molding apparatus, extrusion stamping molding of substrates for optical cards were carried out in the same manner as in Example 1 for 5 hours.

The substrate thus molded was examined to make evaluation in the same manner as in Example 1. As a result, for the substrates molded later than 2 hours from the start of stamping molding, the sheet thickness precision became as good as ±10 μm or less on the basis of the standard thickness of 0.4 mm, the transfer precision was 95% or more, and the birefringence 20 nm or less.

Example 2

A stamper member to be fitted to the periphery of the roll substrate 109 was prepared in the following way.

On a mirror-polished quartz glass substrate 5 mm thick, 300 mm long and 350 mm wide, a 3,000 Å thick chromium thin film was formed by sputtering. This thickness corresponded to the depth of the preformat pattern. On the chromium thin film, a positive photoresist (trade name: AZ-1370; available from Hoechist Japan Ltd.) was further applied by spin coating in a thickness of 1,000 Å, followed by baking.

Next, on the resist layer, a preformat pattern corresponding to four optical cards as shown in FIG. 27A was printed using electron rays.

Here, the optical preformats refer to a pattern comprised of tracking tracks of 3 μm wide and 12 μm pitch, formed in stripes in a region 80 mm long and 40 mm wide in parallel to their longitudinal direction.

Next, the resist layer was developed using a developer (trade name: AZ-312 MIF; available from Hoechist Japan Ltd.) to form a resist pattern.

Next, the chromium thin film not covered with the photoresist layer was etched with 6N hydrochloric acid until the glass substrate became bare, followed by well washing and then drying. Subsequently, the remaining photoresist was removed by ashing by means of an oxygen plasma asher to obtain a master stamper on which an optical card preformat pattern had been formed.

With regard to this master stamper, its surface precision was measured in the same manner as the above to ascertain that the region of a circle of 200 mm diameter embracing each optical card pattern had a surface precision of 19.0 μm, and the regions of any three circles of 50 mm diameter each having the center within the region of 200 mm in diameter all had a surface precision of 9.8 μm.

Using this master stamper, a stamper was prepared in the same manner as in Example 1. The resulting stamper had the same surface precision as the master stamper.

Next, the stamper was cut using a laser to have a size of 240 mm wide and 300 mm long in outer shape. Here, the stripelike preformat pattern and the stamper were made parallel in their longitudinal direction.

Subsequently, on the back of both lengthwise ends of the stamper fixing members 10 mm thick, 15 mm wide and 400 mm long, having the cross-sectional shape as shown by reference numeral 190 in FIG. 20 and made of stainless steel were welded using an electron-beam welding device (trade name: EPM 6LB; manufactured by Mitsubishi Electric Corp.) in the manner that it overlapped with the stamper in a width of 5 mm. Thus, three stampers (used as stamper members of the roll stamper) with fixing members were made ready.

The three stamper members thus prepared were fitted to a specular roll substrate 109 made of hard chrome plated steel, having a diameter of 300 mm and a roll face length of 400 mm. Thus, the roll stamper 102 was prepared.

Meanwhile, as the molding roll 104, a roll made of carbon steel, having a diameter of 300 mm and a roll face length of 400 mm was made ready. Next, the carbon steel roll used in the molding roll 104 was cut at its middle portion 50 mm inside from each edge in a depth of 0.6 mm, and hard chrome plating was applied to the cut surface, followed by mirror polishing to produce the molding roll 104 having the gap control means 108 as shown in FIG. 8.

The roll stamper 102 and molding roll 104 were set up in the apparatus shown in FIG. 1, and were rotated at the same angular velocity without bringing them into contact, to measure the gap variation. As a result, the gap variation was 90 μm.

Subsequently, the pressure of the molding roll 104 against the roll stamper 102 was set at 150 kgf, and the variation at the gap where the resin was pressed between them was measured while bringing the roll stamper 102 into contact with the molding roll 104 through the gap control means 108. As a result, the gap variation was 20 μm. Next, while maintaining this pressure, the extrusion stamping molding of substrates for optical cards was continuously carried out for 5 hours.

Here, the stamping molding conditions and the molding material were the same as those in Example 1.

On the substrates for optical recording mediums thus obtained, evaluation was made in the same manner as in Example 1. As a result, for the substrate sheet molded later than 30 minutes from the start of stamping molding, the substrate sheet thickness precision was as high as ±12 μm or less on the basis of the standard thickness of 0.4 mm, the transfer precision was 94% or more, and the birefringence was 20 nm or less.

Example 3

A specular roll made of hard chrome plated steel, having a diameter of 300 mm and a roll face length of 400 mm was masked at the center area of 300 mm width along its periphery, and chrome plating was applied to both marginal ends in a thickness of 0.72 mm. Thereafter, land portions at both ends were polished to have an even height of 0.7 mm with respect to the middle portion, to obtain the molding roll 104 having the gap control means 108.

Meanwhile, to the periphery of a specular roll made of hard chrome plated steel, having a diameter of 298 mm and a roll face length of 400 mm, three stamper members prepared in the same manner as in Example 2 were fitted through a 100 μm thick polyimide sheet (trade name: UPILEX; available from Ube Industries, Ltd.). Thus, the roll stamper 102 was prepared.

The roll stamper 102 and molding roll 104 were set up in the apparatus shown in FIG. 1, and were rotated at the same angular velocity without bringing them into contact, to measure the gap variation. As a result, the gap variation was 100 μm.

Subsequently, the pressure of the molding roll 104 against the roll stamper 102 was set at 200 kgf, and the variation at the gap where the resin was pressed between them was measured while bringing the roll stamper 102 into contact with the molding roll 104 through the gap control means 108. As a result, the gap variation was 19 μm.

Next, while maintaining this pressure, a 230 mm wide molten resin sheet of a bisphenol-A type polycarbonate (trade name: S-2000R; available from Mitsubishi Gas Chemical Company, Inc.) extruded from the die 101-2 was pressed between them to mold 0.4 mm thick substrates for optical cards. This stamping molding was continuously carried out for 5 hours.

As the conditions for stamping molding, the temperature of the die 101-2 was adjusted to 300° C., the surface temperature of the roll stamper 102° to 140° C., the molten resin sheet transport speed to 4 m/min, and the resin output from the die 101-2 to 24 kg/hour.

On the substrates for optical recording mediums thus obtained, evaluation was made in the same manner as in Example 1. As a result, for the substrate sheet molded later than 30 minutes from the start of stamping molding, the substrate sheet thickness precision was as high as ±9 μm or less on the basis of the standard thickness of 0.4 mm, the transfer precision was 95% or more, and the birefringence was 15 nm or less.

Example 4

The roll stamper 102 was prepared in the same manner as in Example 3.

Meanwhile, a specular roll made of hard chrome plated steel, having a diameter of 300 mm and a roll face length of 400 mm was made ready.

These rolls were set up in the apparatus shown in FIG. 14. Then the roll stamper 102 and the molding roll 104 were rotated at the same angular velocity without use of the gap control means 108, to measure the gap variation between them. As a result, the gap variation was 80 μm.

Subsequently, as a gap control means a pair of disks of 150 mm diameter and 700 μm thick, made of stainless steel (SUS430) were used. To the rotational center of each disc a shaft and a bearing were fitted so as to fix the shaft to the molding apparatus. The roll stamper and the molding roll were so provided that they came into contact with each other through the disks and the length of the contact site was 2 cm on one side and 4 cm on both sides. The pressure of the molding roll 104 against the roll stamper 102 was set at 100 kgf. Here, the gap variation at the gap where the resin was pressed between them was 20 μm.

Next, while maintaining this pressure, a 230 mm wide molten resin sheet of a bisphenol-A type polycarbonate (trade name: S-2000R; available from Mitsubishi Gas Chemical Company, Inc.) extruded from the die 101-2 was pressed between them to mold 0.4 mm thick substrates for optical cards. This stamping molding was continuously carried out for 5 hours.

As the conditions for stamping molding, the temperature of the die 101-2 was adjusted to 310° C., the surface temperature of the roll stamper 102° to 140° C., the molten resin sheet transport speed to 3 m/min, and the resin output from the die 101-2 to 18 kg/hour.

On the substrates for optical recording mediums thus obtained, evaluation was made in the same manner as in Example 1. As a result, for the substrate sheet molded later than 30 minutes from the start of stamping molding, the substrate sheet thickness precision was as high as ±10 μm or less on the basis of the standard thickness of 0.4 mm, the transfer precision was 96% or more, and the birefringence was 18 nm or less.

Example 5

An apparatus for stamping molding substrates for optical cards was set up in the same manner as in Example 4 except that as the gap control means the disk 141 was replaced with the stainless steel endless belt as shown in FIG. 13.

The stainless steel endless belt 108 used was 310 μm thick and 40 mm wide, and the stainless steel endless belt 108' was 410 μm thick and 30 mm wide. They were each set in a length (peripheral length) of 1,700 mm.

Then, the pressure of the molding roll 104 against the roll stamper 102 was set at 170 kgf. Here, the gap variation at the gap where the resin was pressed between them was 21 μm.

Next, while maintaining this pressure, a 230 mm wide molten resin sheet of a bisphenol-A type polycarbonate (trade name: S-2000R; available from Mitsubishi Gas Chemical Company, Inc.) extruded from the die 101-2 was pressed between them to mold 0.4 mm thick substrates for optical cards. This stamping molding was continuously carried out for 5 hours.

As the conditions for stamping molding, the temperature of the die 101-2 was adjusted to 310° C., the surface temperature of the roll stamper 102° to 140° C., the molten resin sheet transport speed to 3 m/min, and the resin throughput from the die 101-2 to 18 kg/hour.

On the substrates for optical recording mediums thus obtained, evaluation was made in the same manner as in Example 1. As a result, for the substrate sheet molded later than 30 minutes from the start of stamping molding, the substrate sheet thickness precision was as high as ±11 μm or less on the basis of the standard thickness of 0.4 mm, the transfer precision was 95% or more, and the birefringence was 15 nm or less.

Example 6

In the manner similar to Example 2, eight nickel stampers (stamper members) were prepared, each having an external size of 200 mm long, 300 mm wide and 0.2 mm thick and having four optical card preformat patterns on its surface.

Here, the preformat patterns of these stamper members were as to be in parallel in its short-side direction of the stamper member.

These stamper members were welded to each other side by side at their long sides, using a YAG laser to produce a continuous sheet stamper of 1,600 mm long, 300 mm wide and 200 μm thick. On both lengthwise ends of this continuous sheet stamper, stainless steel belts of 20 mm wide, 1,600 mm long and 400 μm thick were welded using the YAG laser. Then, the resulting continuous sheet stamper was welded end to end using a YAG laser so as to form a circle. Thus, the endless stamper 211 as shown in FIG. 21, having a width of 300 mm and a peripheral length of 1,600 mm, was obtained.

Next, this endless stamper 211 was set up in the apparatus shown in FIG. 22.

A specular roll made of hard chrome plated steel, having a diameter of 300 mm was used as the roll substrate 109, and the one having a diameter of 51 mm was used as the molding roll 104. The gap variation between these rolls was 100 μm. Then, the pressure of the molding roll 104 against the roll substrate 109 was set at 110 kgf, and the variation at the gap where the resin was pressed between them was measured for one round of the endless stamper 211 to find that it was 18 μm.

Next, while maintaining this pressure, a 250 mm wide molten resin sheet of a bisphenol-A type polycarbonate (trade name: S-2000R; available from Mitsubishi Gas Chemical Company, Inc.) extruded from the die 101-2 was pressed between them to mold 0.4 mm thick substrates for optical cards. This stamping molding was continuously carried out for 5 hours.

As the conditions for stamping molding, the temperature of the die 101-2 was adjusted to 300° C., the surface temperature of the endless stamper 211° to 150° C., the molten resin sheet transport speed to 3 m/min, and the resin throughput from the die 101-2 to 22 kg/hour.

On the substrates for optical recording mediums thus obtained, evaluation was made in the same manner as in Example 1. As a result, for the substrate sheet molded later than 30 minutes from the start of stamping molding, the substrate sheet thickness precision was as high as ±20 μm or less on the basis of the standard thickness of 0.4 mm, the transfer precision was 95% or more, and the birefringence was 20 nm or less.

Example 7

Figure 31A:
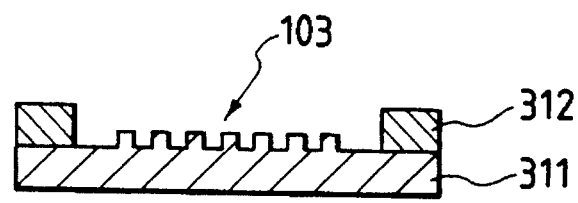
FIGS. 31A to 31F illustrate a process for preparing a stamper having the gap control means.
Figure 31B:
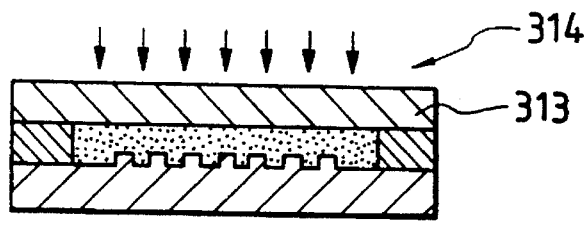
Figure 31C:
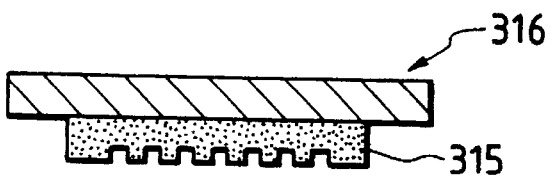
Figure 31D:
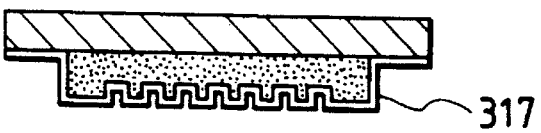
Figure 31E:
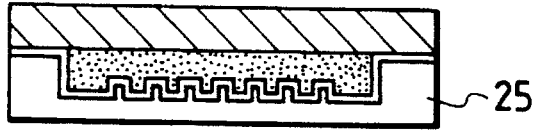
Figure 31F:
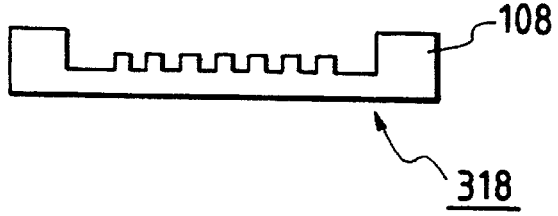

On a master stamper 311 (350 mm×350 mm, 5 mm thick) having a preformat pattern, a spacer 312 of 400 μm thick was provided as shown in FIG. 31A, and a glass plate of 350 mm×350 mm and 5 mm thick was superposed thereon to make up a molding unit. Thereafter, an ultraviolet curable resin (trade name: STM401; available from Dainippon Ink & Chemicals, Incorporated) was injected into the molding unit, followed by ultraviolet curing. Then, the master stamper 311 with a preformat pattern and the spacer 312 were removed to obtain a replica with a terrace of 450 μm (FIG. 31C). Next, on the pattern surface of the replica, a Ni film of about 1,000 Å thick was formed by sputtering (FIG. 31D), followed by electroforming of Ni to form a Ni film of 620 to 630 μm thick. The Ni surface was polished to obtain a terraced Ni stamper 318 with a thickness of 200 μm at the stamper portion and a thickness of 600 μm at the terraced portion (actual difference in height: 400 μm). Six sheets of this stamper (stamper member) were made ready.

Perimeters of the stamper members were cut in the desired size (300 mm×30 mm), and were each brought end to end in a circular form as in Example 6, followed by welding using the YAG laser. Thus, the endless stamper 211 with a 2 cm wide gap control means as shown in FIG. 21 was obtained. Using this stamper, an apparatus for stamping molding substrates for optical recording mediums was set up in the same manner as in Example 6.

Then, the pressure of the molding roll 104 against the roll substrate 109 was set at 110 kgf, and any variation at the gap where the resin was pressed between them was measured for one round of the endless stamper to find that it was 19 μm.

Next, while maintaining this pressure, a 250 mm wide molten resin sheet of a bisphenol-A type polycarbonate (trade name: S-2000R; available from Mitsubishi Gas Chemical Company, Inc.) extruded from the die 101-2 was pressed between them to mold 0.4 mm thick substrates for optical cards. This stamping molding was continuously carried out for 5 hours.

As conditions for stamping molding, the temperature of the die 101-2 was adjusted to 300° C., the surface temperature of the endless stamper 211° to 150° C, the molten resin sheet transport speed to 3 m/min, and the resin throughput from the die 101-2 to 22 kg/hour.

On the substrates for optical recording mediums thus obtained, evaluation was made in the same manner as in Example 1. As a result, for the substrate sheet molded later than 30 minutes from the start of stamping molding, the substrate sheet thickness precision was as high as ±20 μm or less on the basis of the standard thickness of 0.4 mm, the transfer precision was 96% or more, and the birefringence was 17 nm or less.

Example 8

Three sheets of stampers with fixing members were prepared in the same manner as in Example 2. Stated specifically, these were nickel stampers of 295 mm long, 300 mm wide and 0.2 mm thick, each having on its surface a four optical card preformat pattern as shown in FIG. 27A, the preformat pattern being formed in parallel in the length direction of the stamper. The fixing members were welded on both lengthwise ends of the stamper.

Next, on both widthwise ends of the stamper on its side where the preformat pattern had been formed, the gap control means 108 was fixed to produce the stamper as shown in FIG. 18. As the gap control means, a stainless steel (SUS430) rolled sheet having the same length as the stamper, a width of 25 mm and a thickness of 450 μm was used, and was welded to the stamper by means of a YAG laser. As a YAG laser welding device, ML-2220A (manufactured by Miyaji Laser System K.K.), and the welding was carried out under the conditions of: charging voltage: 350 V, pulse width: 1.0 ms; defocus: 5 mm, REP-RATE (PPS): 20; and power: 35 to 65 W.

Next, the stampers (stamper members) thus obtained were each fittingly inserted to the engageable groove of the roll substrate 109 prepared in the same manner as in Example 1 and fixed there. Then, its recessed portion between the adjacent fixing members was filled with a silicon resin (trade name: KE-1204; available from Shin-Etsu Silicone Co., Ltd.) as a filler 193 as shown in FIG. 19, and also, as the additional gap control means 194, a stainless steel (SUS430) rolled sheet of 25 mm wide and 450 μm thick was secured with screws along each edge of the stamper member. The roll stamper 102 was thus prepared. The length of the additional gap control means 194 was provided so as to overlap with the gap control means 108 in a length of 10 cm.

Meanwhile, as the molding roll 104, a specular roll made of hard chrome plated steel, having a diameter of 312 mm and a roll face length of 500 mm was made ready.

The roll stamper 102 and molding roll 104 were set up in the apparatus shown in FIG. 1, and were rotated at the same angular velocity without bringing both of them into contact, to measure the variation at the gap between them. As a result, the gap variation was 100 μm.

Subsequently, the pressure of the molding roll 104 against the roll stamper 102 was set at 140 kgf, and any variation at the gap where the resin was pressed between them was measured for one round of the roll stamper while bringing the roll stamper 102 into contact with the molding roll 104 through the gap control means 108. As a result, the gap variation was 18 μm.

Next, while maintaining this pressure, a 250 mm wide molten resin sheet of a bisphenol-A type polycarbonate (trade name: PANLITE L-1250; available from Teijin Chemicals Ltd.) extruded from the die 101-2 was pressed between them to mold 0.4 mm thick substrates for optical cards. This stamping molding was continuously carried out for 5 hours.

As the conditions for stamping molding, the temperature of the die 101-2 was adjusted to 300° C., the surface temperature of the roll stamper 102° to 150° C., the molten resin sheet transport speed to 3 m/min, and the resin throughput from the die 101-2 to 22 kg/hour.

On the substrates for optical recording mediums thus obtained, evaluation was made in the same manner as in Example 1. As a result, for the substrate sheet molded later than 30 minutes from the start of stamping molding, the substrate sheet thickness precision was as high as ±19 μm or less on the basis of the standard thickness of 0.4 mm, the transfer precision was 95% or more, and the birefringence was 20 nm or less.

What is claimed is:

1. A process for successively manufacturing substrates for optical recording mediums, said process comprising the steps of:

feeding a thermoplastic resin, heated to a given temperature, to a gap between a roll stamper comprising a roll substrate fitted along its periphery with a flexible stamper member having a preformat pattern and a roll provided opposingly to the roll stamper, from a means for extruding the thermoplastic resin while rotating the roll stamper and the roll at a given rotational speed, providing gap control means on the periphery of either the roll stamper or the roll; and pressing the thermoplastic resin between the roll stamper and the roll to make a transfer of the preformat pattern; wherein, the thermoplastic resin is pressed between the roll stamper and the roll while bringing the former into contact with the latter through the gap control means at a region other than a region in which the roll stamper comes into contact with the thermoplastic resin on the roll.

2. The process for manufacturing substrates for optical recording mediums according to claim 1, wherein the roll is pressed against the roll stamper at a pressing force of from 686 to 7840N (70 to 800 kgf).

3. The process for manufacturing substrates for optical recording mediums according to claim 1, wherein the roll is pressed against the roll stamper at a pressing force of from 980 to 4900N (100 to 500 kgf).

4. The process for manufacturing substrates for optical recording mediums according to claim 1, wherein the gap control means is provided on the periphery of the roll stamper.

5. The process for manufacturing substrates for optical recording mediums according to claim 1, wherein the gap control means is provided on the periphery of the roll.

6. The process for manufacturing substrates for optical recording mediums according to claim 5, wherein the gap control means comprises a belt member with a given thickness, fixed on a region other than the region in which the roll comes into contact with the thermoplastic resin.

7. The process for manufacturing substrates for optical recording mediums according to claim 6, wherein the belt member is fixed on each side of the region in which the roll comes into contact with the thermoplastic resin.

8. The process for manufacturing substrates for optical recording mediums according to claim 7, wherein the belt member is fixed in plurality on each end of the periphery of the roll.

9. The process for manufacturing substrates for optical recording mediums according to claim 8, wherein the belt member fixed in plurality on each end of the periphery of the roll is so fixed that joints of the respective belt members are formed at positions different from each other on the periphery of the roll substrate.

10. The process for manufacturing substrates for optical recording mediums according to claim 5, which further comprises the step of cleaning the surface at which the gap control means comes into contact with the roll stamper.

11. The process for manufacturing substrates for optical recording mediums according to claim 1, wherein the gap control means is provided on the flexible stamper member in a region other than a region in which the preformat pattern thereof is formed.

12. The process for manufacturing substrates for optical recording mediums according to claim 11, further comprising the step of cleaning the surface at which the gap control means comes into contact with the surface of the roll.

13. The process for manufacturing substrates for optical recording mediums according to claim 1, wherein the gap control means is provided on the periphery of the roll substrate.

14. The process for manufacturing substrates for optical recording mediums according to claim 13, wherein the gap control means is formed by cutting the roll substrate at a part on which the flexible stamper member is fixed.

15. The process for manufacturing substrates for optical recording mediums according to claim 13, wherein the gap control means comprises a belt member with a given thickness, fixed on a region other than the region in which the flexible stamper member is fixed on the roll substrate.

16. The process for manufacturing substrates for optical recording mediums according to claim 15, wherein the belt member comprises a metal sheet.

17. The process for manufacturing substrates for optical recording mediums according to claim 16, wherein the metal sheet comprises a stainless steel sheet.

18. The process for manufacturing substrates for optical recording mediums according to claim 15, wherein the belt member is fixed on each side of the periphery of the roll substrate at its part on which the flexible stamper member is fixed.

19. The process for manufacturing substrates for optical recording mediums according to claim 18, wherein the belt member is fixed in plurality on each end of the periphery of the roll substrate.

20. The process for manufacturing substrates for optical recording mediums according to claim 19, wherein the belt member fixed in plurality on each end of the periphery of the roll is so fixed that joints of respective belt members are formed at positions different from each other on the periphery of the roll substrate.

21. The process for manufacturing substrates for optical recording mediums according to claim 13, further comprising the step of cleaning the surface at which the gap control means comes into contact with the surface of the roll.

22. The process for manufacturing substrates for optical recording mediums according to claim 1, wherein the gap control means is so provided as to be held between the roll stamper and the roll in a region other than the region in which the thermoplastic resin comes into contact with the roll stamper and the roll.

23. The process for manufacturing substrates for optical recording mediums according to claim 22, further comprising the step of cleaning the surface at which the gap control means comes into contact with the roll stamper and the surface at which the same comes into contact with the surface of the roll.

24. An apparatus for successively manufacturing substrates for optical recording mediums, said apparatus comprising:

means for extruding a thermoplastic resin;

a roll stamper comprising a roll substrate fitted along its periphery with a flexible stamper member having a preformat pattern;

a roll for molding the substrates for optical recording mediums by pressing the extruded resin between said roll and said roll stamper to transfer the preformat pattern to the surface of a sheet of the resin, and gap control means on the periphery of either the roll stamper or the roll; wherein, said roll stamper and said roll are so provided as to come into contact with each other through the gap control means at a region other than a region in which said roll stamper comes into contact with the thermoplastic resin on said roll.

25. The apparatus for manufacturing substrates for optical recording mediums according to claim 24, wherein the gap control means is provided on the periphery of said roll stamper.

26. The apparatus for manufacturing substrates for optical recording mediums according to claim 25, further comprising means for cleaning the surface at which the gap control means comes into contact with the surface of said roll.

27. The apparatus for manufacturing substrates for optical recording mediums according to claim 24, wherein the gap control means is provided on the periphery of said roll.

28. The apparatus for manufacturing substrates for optical recording mediums according to claim 27, wherein the gap control means comprises a belt member with a given thickness, fixed on a region other than the region in which said roll comes into contact with the thermoplastic resin.

29. The apparatus for manufacturing substrates for optical recording mediums according to claim 28, wherein the belt member is fixed on each side of the region in which said roll comes into contact with the thermoplastic resin.

30. The apparatus for manufacturing substrates for optical recording mediums according to claim 29, wherein the belt member is fixed in plurality on each end of the periphery of said roll.

31. The apparatus for manufacturing substrates for optical recording mediums according to claim 30, wherein the belt member fixed in plurality on each end of the periphery of said roll is so fixed that joints of the respective belt members are formed at positions different from each other on the periphery of said roll substrate.

32. The apparatus for manufacturing substrates for optical recording mediums according to claim 27, further comprising means for cleaning the surface at which the gap control means comes into contact with said roll stamper.

33. The apparatus for manufacturing substrates for optical recording mediums according to claim 24, wherein the gap control means is provided on said flexible stamper member in a region other than a region in which the preformat pattern thereof is formed.

34. The apparatus for manufacturing substrates for optical recording mediums according to claim 33, further comprising means for cleaning the surface at which the gap control means comes into contact with the surface of said roll.

35. The apparatus for manufacturing substrates for optical recording mediums according to claim 24, wherein the gap control means is provided on the periphery of said roll substrate.

36. The apparatus for manufacturing substrates for optical recording mediums according to claim 35, wherein the gap control means is formed by cutting means which cuts said roll substrate at a part on which said flexible stamper member is fixed.

37. The apparatus for manufacturing substrates for optical recording mediums according to claim 35, wherein the gap control means comprises a belt member with a given thickness, fixed on a region other than a region in which said flexible stamper member is fixed on said roll substrate.

38. The apparatus for manufacturing substrates for optical recording mediums according to claim 37, wherein the belt member is fixed on each side of the periphery of said roll substrate at its part on which said flexible stamper member is fixed.

39. The apparatus for manufacturing substrates for optical recording mediums according to claim 38, wherein the belt member is fixed in plurality on each end of the periphery of said roll substrate.

40. The apparatus for manufacturing substrates for optical recording mediums according to claim 39, wherein the belt member fixed in plurality on each end of the periphery of said roll is so fixed that joints of respective belt members are formed at positions different from each other on the periphery of said roll substrate.

41. The apparatus for manufacturing substrates for optical recording mediums according to claim 37, wherein the belt member comprises a metal sheet.

42. The apparatus for manufacturing substrates for optical recording mediums according to claim 41, wherein the metal sheet comprises a stainless steel sheet.

43. The apparatus for manufacturing substrates for optical recording mediums according to claim 35, further comprising means for cleaning the surface at which the gap control means comes into contact with the surface of said roll.

44. The apparatus for manufacturing substrates for optical recording mediums according to claim 24, wherein the gap control means is so provided as to be held between said roll stamper and said roll in a region other than a region in which the thermoplastic resin comes into contact with said roll stamper and said roll.

45. The apparatus for manufacturing substrates for optical recording mediums according to claim 44, further comprising means for cleaning the surface at which the gap control means comes into contact with said roll stamper and the surface at which the same comes into contact with the surface of said roll.

46. A process for successively manufacturing substrates for optical recording mediums, said process comprising the steps of:

feeding a thermoplastic resin, heated to a given temperature, to a gap between a roll stamper comprising a roll substrate fitted along its periphery with a flexible stamper member having a preformat pattern and a molding roll provided opposingly to the roll stamper, from a means for extruding the thermoplastic resin while rotating the roll stamper and the molding roll at a given rotational speed, providing gap control means on the periphery of either the roll stamper or the molding roll; and pressing the thermoplastic resin between the roll stamper and the molding roll to make a transfer of the preformat pattern; wherein, the thermoplastic resin is pressed between the roll stamper and the molding roll while bringing the former into contact with the latter through the gap control means at a region other than a region in which the roll stamper comes into contact with the thermoplastic resin on the molding roll; and the flexible stamper member comprises a stamper having a surface precision of 10 microns or less.

47. A process for successively manufacturing substrates for optical recording mediums, said process comprising the steps of:

feeding a thermoplastic resin, heated to a given temperature, to a gap between a roll stamper comprising a roll substrate fitted along its periphery with a flexible stamper member having a preformat pattern and a molding roll provided opposingly to the roll stamper, from a means for extruding the thermoplastic resin while rotating the roll stamper and the molding roll at a given rotational speed, providing gap control means on the periphery of either the roll stamper or the molding roll; and pressing the thermoplastic resin between the roll stamper and the molding roll to make a transfer of the preformat pattern; wherein, the thermoplastic resin is pressed between the roll stamper and the molding roll while bringing the former into contact with the latter through the gap control means at a region other than a region in which the roll stamper comes into contact with the thermoplastic resin on the molding roll; and wherein the flexible stamper member comprises a stamper produced from a master stamper prepared according to the steps of:

forming a pattern forming layer on the surface of a master stamper substrate;

forming a positive resist layer on the pattern forming layer;

selectively exposing the positive resist layer in accordance with the preformat pattern of the optical recording medium and, at the same time, exposing the resist layer other than that in the region in which the pattern is formed;

developing the resist layer to form a resist pattern; and etching the pattern forming layer, using the resist pattern as a mask.

48. An apparatus for successively manufacturing substrates for optical recording mediums, said apparatus comprising:

means for extruding a thermoplastic resin;

a roll stamper comprising a roll substrate fitted along its periphery with a flexible stamper member having a preformat pattern;

a molding roll for molding the substrates for optical recording mediums by pressing the extruded resin between said molding roll and said roll stamper to transfer the preformat pattern to the surface of a sheet of the resin, and gap control means on the periphery or either the roll stamper or the molding roll; wherein, said roll stamper and said molding roll are so provided as to come into contact with each other through the gap control means at a region other than the region in which said roll stamper comes into contact with the thermoplastic resin on said molding roll; and said flexible stamper member comprises a stamper having a surface precision of 10 microns or less.

49. An apparatus for manufacturing substrates for optical recording mediums by continuously preparing substrates for optical recording mediums, said apparatus comprising:

means for extruding a thermoplastic resin;

a roll stamper comprising a roll substrate fitted along its periphery with a flexible stamper member having a preformat pattern;

a molding roll for molding the substrates for optical recording mediums by pressing the extruded resin between said molding roll and said roll stamper to transfer the preformat pattern to the surface of a sheet of the resin, and gap control means on the periphery of either the roll stamper or the molding roll; wherein, said roll stamper and said molding roll are so provided as to come into contact with each other through the gap control means at a region other than a region in which said roll stamper comes into contact with the thermoplastic resin on said molding roll; and said flexible stamper member comprises a stamper produced from a master stamper prepared according to the steps of:

forming a pattern forming layer on the surface of a master stamper substrate;

forming a positive resist layer on the pattern forming layer;

selectively exposing the positive resist layer in accordance with the preformat pattern of the optical recording medium and, at the same time, exposing the resist layer other than that in the region in which the pattern is formed;

developing the resist layer to form a resist pattern; and etching the pattern forming layer, using the resist pattern as a mask.

* * * * *

UNITED STATES PATENT AND TRADEMARK OFFICE
CERTIFICATE OF CORRECTION

PATENT NO. : 5,527,497

DATED : June 18, 1996

INVENTOR(S) : OSAMU KANOME, ET AL.

It is certified that error appears in the above-indentified patent and that said Letters Patent is hereby corrected as shown below:

COLUMN 1

Line 38, "more" should read --further--;
Line 46, "C/N ratio)" should read --S/N ratio)--; and
Line 55, "smaller, stated" should read --smaller. Stated--.

COLUMN 2

Line 25, "mediums," should read --mediums--.

COLUMN 4

Lines 8-11, "come into contact with each other through a gap control means at a region other than the region in which said roll stamper comes into contact with the thermoplastic resin on said roll." should not be indented.

COLUMN 7

Line 67, "end e wedge type" should read --and a wedge-type--.

COLUMN 8

Line 6, "blocks 20-21" should read --blocks 202-1--;
Line 24, "Poll" should read --roll--; and
Line 39, "wedge type" should read --wedge-type--.

COLUMN 9

Line 21, "et" should read --at--.

UNITED STATES PATENT AND TRADEMARK OFFICE
CERTIFICATE OF CORRECTION

PATENT NO. : 5,527,497                              Page 2 of 3
DATED      : June 18, 1996
INVENTOR(S): OSAMU KANOME, ET AL.

It is certified that error appears in the above-indentified patent and that said Letters Patent is hereby corrected as shown below:

COLUMN 10

Line 59, "scratching remove the resin," should read --scratching,--.

COLUMN 11

Line 50, "means 108'." should read --means 108 and 108'.--.

COLUMN 12

Line 28, "so-that" should read --so that--.

COLUMN 13

Line 60, "Poll" should read --roll--.

COLUMN 25

Line 61, "were as" should read --were formed so as--.

UNITED STATES PATENT AND TRADEMARK OFFICE
CERTIFICATE OF CORRECTION

PATENT NO. : 5,527,497
DATED : June 18, 1996
INVENTOR(S) : OSAMU KANOME, ET AL.

It is certified that error appears in the above-indentified patent and that said Letters Patent is hereby corrected as shown below:

COLUMN 32

Line 64, "or" should read --of--.

Signed and Sealed this

Twenty-fifth Day of March, 1997

*Attest:*

BRUCE LEHMAN

*Attesting Officer*  Commissioner of Patents and Trademarks